(12) United States Patent
Jha et al.

(10) Patent No.: US 11,044,309 B2
(45) Date of Patent: Jun. 22, 2021

(54) OPTIMIZING OPERATIONS IN ICN BASED NETWORKS

(71) Applicant: Intel Corporation, Santa Clara, CA (US)

(72) Inventors: Satish Chandra Jha, Hillsboro, OR (US); Kathiravetpillai Sivanesan, Portland, OR (US); Ned M. Smith, Beaverton, OR (US); Srikathyayani Srikanteswara, Portland, OR (US); Eve M. Schooler, Portola Valley, CA (US); Jeffrey Christopher Sedayao, San Jose, CA (US); Stepan Karpenko, Hillsboro, OR (US); Venkatesan Nallampatti Ekambaram, Hillsboro, OR (US); S. M. Iftekharul Alam, Hillsboro, OR (US); Kuilin Clark Chen, Hillsboro, OR (US); Yi Zhang, Portland, OR (US); Gabriel Arrobo Vidal, Hillsboro, OR (US); Jessica C. McCarthy, Dublin (IE); Maruti Gupta Hyde, Portland, OR (US); Hassnaa Moustafa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/454,836

(22) Filed: Jun. 27, 2019

(65) Prior Publication Data
US 2020/0244728 A1  Jul. 30, 2020

(51) Int. Cl.
*H04L 29/08* (2006.01)
*H04L 12/935* (2013.01)
(Continued)

(52) U.S. Cl.
CPC .......... *H04L 67/1076* (2013.01); *G06F 21/10* (2013.01); *G06F 21/602* (2013.01);
(Continued)

(58) Field of Classification Search
CPC ....... H04L 67/1076; H04L 9/30; H04L 45/20; H04L 49/3009; H04L 67/1091;
(Continued)

(56) References Cited

U.S. PATENT DOCUMENTS

2019/0141495 A1   5/2019   Jha et al.
2019/0141568 A1   5/2019   Balakrishnan et al.

OTHER PUBLICATIONS

K. Hasan and S. Jeong, "A Cluster-Based Content Management Framework for Information-Centric Networking," 2018 Tenth International Conference on Ubiquitous and Future Networks (ICUFN), Prague, 2018, pp. 891-893 (Year: 2018).*
(Continued)

*Primary Examiner* — Nicholas R Taylor
*Assistant Examiner* — Chong G Kim
(74) *Attorney, Agent, or Firm* — Schwegman Lundberg & Woessner, P.A.

(57) ABSTRACT

Techniques are provided for optimizing the operations of an ICN, particularly for an ICN with clustered nodes. A cluster head node may function as an orchestrator and a coordinator for efficient caching, routing, and computing and for co-existence of ICN and IP nodes in the network. A content store of an ICN router may include an indication of the time after which data expires and the new data is to be swapped in place of the expired data after that point in time. Digital rights management (DRM) enforcement is provided by managing access to a DRM engine in at least one of the ICN nodes in a cluster. Congestion control is provided by minimizing the number of ICN scoped interest requests and thereby minimizing the potentially high volume of data responses. These techniques optimize interest packet for-
(Continued)

warding and processing through collaboration with neighboring ICN nodes.

24 Claims, 11 Drawing Sheets

(51) Int. Cl.
| | |
|---|---|
| *H04L 12/733* | (2013.01) |
| *G06F 21/10* | (2013.01) |
| *G06F 21/60* | (2013.01) |
| *H04L 9/30* | (2006.01) |

(52) U.S. Cl.
CPC ............... *H04L 9/30* (2013.01); *H04L 45/20* (2013.01); *H04L 49/3009* (2013.01); *H04L 67/1091* (2013.01); *H04L 67/1093* (2013.01); *H04L 67/2852* (2013.01); *H04L 67/327* (2013.01); *G06F 2221/0713* (2013.01)

(58) Field of Classification Search
CPC ............. H04L 67/1093; H04L 67/2852; H04L 67/327; G06F 21/10; G06F 21/602; G06F 2221/0713
USPC ........................................................ 709/245
See application file for complete search history.

(56) References Cited

OTHER PUBLICATIONS

T. Le, Y. Lu and M. Gerla, "Social caching and content retrieval in Disruption Tolerant Networks (DTNs)," 2015 International Conference on Computing, Networking and Communications (ICNC), Garden Grove, CA, 2015, pp. 905-910 (Year: 2015).*

M. Gohar and et al, "Cluster-based device mobility management in named data networking for vehicular network", Mobile Information Systems, Aug. 2018 (Year: 2018).*

W. Huang, T. Song, Y. Yang and Y. Zhang, "Cluster-Based Cooperative Caching With Mobility Prediction in Vehicular Named Data Networking," in IEEE Access, vol. 7, pp. 23442-23458, 2019 (Year: 2019).*

Li, Chengming, "Cluster-based In-networking Caching for Content-Centric Networking", IJCSNS International Journal of Computer Science and Network Security, vol. 14 No. 11, (Nov. 2014), 9 pgs.

Mastorakis, S, "ICN Traceroute Protocol Specification", ICNRG draft-mastorakis-icnrg-icntraceroute-00, (Sep. 19, 2016), 15.

Yan, Huan, "Caching Strategy Based on Hierarchical Cluster for Named Data Networking", Special Section on Future Networks: Architectures, Protocols, and Applications, IEEE Access, (2017), 11 pgs.

"European Application Serial No. 20164730.2, Extended European Search Report dated Sep. 8, 2020", 9 pgs.

* cited by examiner

OPTIMIZING OPERATIONS IN ICN BASED NETWORKS

TECHNICAL FIELD

Embodiments described herein generally relate to computer networking and more specifically to techniques for optimizing the operations of ICN networks.

BACKGROUND

Information-Centric Networking (ICN) is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following description with respect to FIGS. 1-12 sufficiently illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims. The example embodiments are presented for illustrative purposes only and are not intended to be restrictive or limiting on the scope of the disclosure or the claims presented herein.

The functions described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

ICN System Overview

Figure 1:
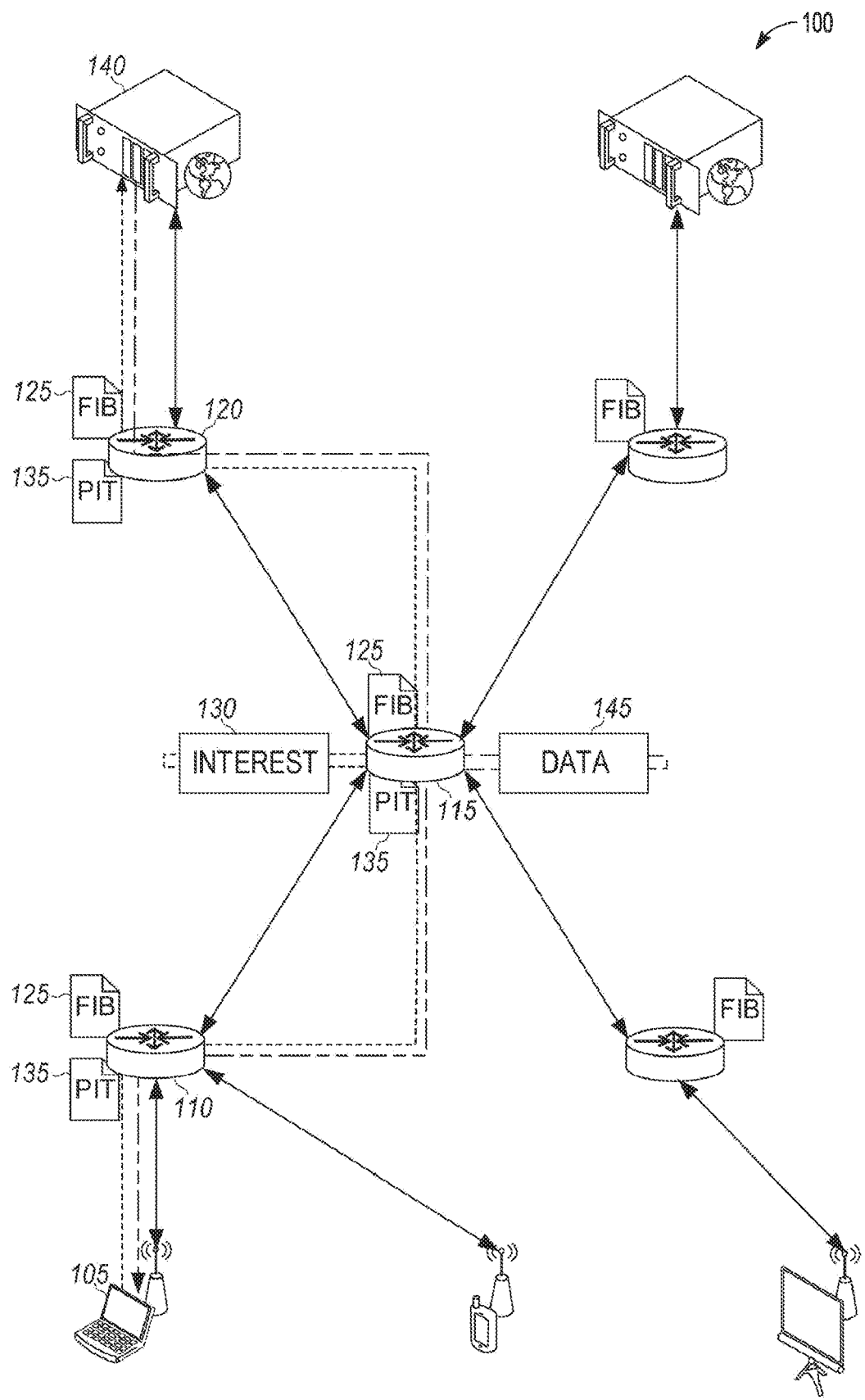
FIG. 1 illustrates an example information-centric network (ICN) according to an embodiment.

FIG. 1 illustrates an example ICN 100 according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet Protocol (IP), a device locates a host and requests content from the host. The network understands how to route (e.g., direct) packets based on the address specified in the packet. In contrast, ICN 100 does not include a request for a particular machine and does not use addresses. Instead, to get content, a device 105 (e.g., subscriber) requests named content from the network itself. The content request may be called an interest and transmitted via an interest packet 130. As the interest packet traverses network devices (e.g., network elements, routers, switches, hubs, etc.)—such as network elements 110, 115, and 120—a record of the interest is kept, for example, in a pending interest table (PIT) 135 at each network element. Thus, network element 110 maintains an entry in its PIT 135 for the interest packet 130, network element 115 maintains the entry in its PIT 135, and network element 120 maintains the entry in its PIT 135.

When a device, such as publisher 140, that has content matching the name in the interest packet 130 is encountered, that device 140 may send a data packet 145 in response to the interest packet 130. Typically, the data packet 145 is tracked back through the network to the source (e.g., device 105) by following the traces of the interest packet 130 left in the network element PITs 135. Thus, the PIT 135 at each network element establishes a trail back to the subscriber 105 for the data packet 145 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 130 traverses the ICN, ICN network elements will generally attempt to match the name to a greatest degree. Thus, if an ICN element has a cached item or route for both "www-.somedomain.com or videos" and "www.somedomain.com or videos or v8675309," the ICN element will match the latter for an interest packet 130 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 130 to data cached in the ICN element. Thus, for example, if the data 145 named in the interest 130 is cached in network element 115, then the network element 115 will return the data 145 to the subscriber 105 via the network element 110. However, if the data 145 is not cached at network element 115, the network element 115 routes the interest 130 on (e.g., to network element 120). To facilitate routing, the network elements may use a forwarding information base 125 (FIB) to match named data to an interface (e.g., physical port) for the route. Thus, the FIB 125 operates much like a routing table on a traditional network device.

In an example, additional meta-data may be attached to the interest packet 130, the cached data, or the route (e.g., in the FIB 125), to provide an additional level of matching. For example, the data name may be specified as "www.somedomain.com or videos or v8675309," but also include a version number—or timestamp, time range, endorsement, etc. In this example, the interest packet 130 may specify the desired name, the version number, or the version range. The matching may then locate routes or cached data matching the name and perform the additional comparison of metadata or the like to arrive at an ultimate decision as to whether data or a route matches the interest packet 130 for respectively responding to the interest packet 130 with the data packet 145 or forwarding the interest packet 130.

ICN has advantages over host-based networking because the data segments are individually named. This enables aggressive caching throughout the network as a network element may provide a data packet 130 in response to an interest 130 as easily as an original author 140. Accordingly, it is less likely that the same segment of the network will transmit duplicates of the same data requested by different devices.

Fine grained encryption is another feature of many ICN networks. A typical data packet 145 includes a name for the data that matches the name in the interest packet 130. Further, the data packet 145 includes the requested data and may include additional information to filter similarly named data (e.g., by creation time, expiration time, version, etc.). To address malicious entities providing false information under the same name, the data packet 145 may also encrypt its contents with a publisher key or provide a cryptographic hash of the data and the name. Thus, knowing the key (e.g., from a certificate of an expected publisher 140) enables the recipient to ascertain whether the data is from that publisher 140. This technique also facilitates the aggressive caching of the data packets 145 throughout the network because each data packet 145 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Several embodiments are described herein for optimizing the operations of an ICN, particularly for an ICN where the nodes are clustered. In a first embodiment, techniques are described for enabling a cluster head node to function as an orchestrator and a coordinator for efficient caching, routing, and computing in the ICN as well as for co-existence of ICN and IP nodes in the network. In a second embodiment, a content store (CS) of an ICN router is modified to further include an indication of the time after which data expires and the new data is to be swapped in place of the expired data after that point in time. In an example, this technique enables the substitution of a different value for Personally Identifiable Information (PII) after a set period of time to comply with data privacy regulations. In a third embodiment, digital rights management (DRM) enforcement is provided by the ICN by managing access to a DRM engine in at least one of the nodes in a cluster. In a fourth embodiment, techniques are described that provide congestion control for use in a Ubiquitous Witness evidence solicitation protocol where multiple witnesses issue and respond to similar evidence solicitation requests so as to create potential congestion. Different techniques are described for minimizing the number of ICN scoped interest requests and thereby minimizing the potentially high volume of data responses. These and other features described herein optimize interest packet forwarding and processing with neighboring ICN nodes.

Enabling Cluster Head as Orchestrator and Coordinator in ICN Networks

In a cluster-based ICN network, a cluster head (CH) is a node elected by a group of proximity nodes to coordinate communication (message exchanges) or other specific functions among nodes of this group. Usually, each node in the group is able to send and receive message to and from a CH. All other nodes in the group are called cluster members (CMs). The CH acts as a coordinator and orchestrator to effectively optimize cache placement of content and function executables (FEs) and optimizes interest packet forwarding by coordinating with neighboring CHs. A CH may assist in (i) providing an efficient discovery mechanism to exchange information such as cached content/FE in proximity, to forward information base (FIB) entries to reach content and FIBs beyond the immediate proximity of the forwarding node, and to provide computation capabilities in the proximity; (ii) achieving a balanced distribution of content/FEs among available caches in the cluster and proximity (neighboring clusters); (iii) caching a FE and potential associated content at the same or nearby nodes; (iv) forwarding an interest packet efficiently based on information it has collected in advance from neighboring CHs; and (v) acting as an orchestrator to serve an interest packet from a consumer. A CH may also assist in IP/ICN coexistence by, for example, selecting a node with Dual Network protocols (ICN and IP) support as a cluster head, with an adaptation layer between the ICN and an IP network at the CH node.

Sample embodiments described herein optimize interest packet forwarding and processing by providing an end-toend framework and building blocks to enable a cluster head node in an ICN to be used as an orchestrator and coordinator for efficient caching, routing, and computing in the ICN with tight coordination among proximity nodes. The disclosed techniques also enable smooth coexistence of IP and ICN nodes in the same network. The disclosed techniques further enable cache optimization and content delivery with compute and communicate latency optimization in dynamic ad hoc networks like vehicular networks, IoT networks, and the like.

There are some ICN solutions where clustering has been explored for content caching management to reduce redundancy in a cluster/area with a routing strategy adapted to balance a cache hit ratio in the case of reduced cache redundancy. See, for example, Chengming Li and Koji Okamura, "Cluster-based In-networking Caching for Content-Centric Networking", IJCSNS International Journal of Computer Science and Network Security, VOL. 14 No. 11, November 2014; and Huan Yan, et al., "Caching Strategy Based on Hierarchical Cluster for Named Data Networking," Special Section on Future Networks: Architectures, Protocols, and Applications, IEEE Access, 2017. However, these solutions do not consider communication (content retrieval) and computing in caching and routing solutions. Furthermore, these solutions are limited to cache management and do not consider a cluster head as an orchestrator to serve content and compute requests. It remains desirable to provide an end-to-end solution that enables a cluster head node to function as an orchestrator and coordinator for efficient caching, routing, and computing in an ICN network as well as for enabling the smooth coexistence of IP and ICN nodes in the same network. Moreover, existing ICN solutions are not readily applicable to cluster-based dynamic ad hoc networks, such as a vehicular network, as they are not designed for inherently unreliable and dynamic wireless environments.

Figure 2:
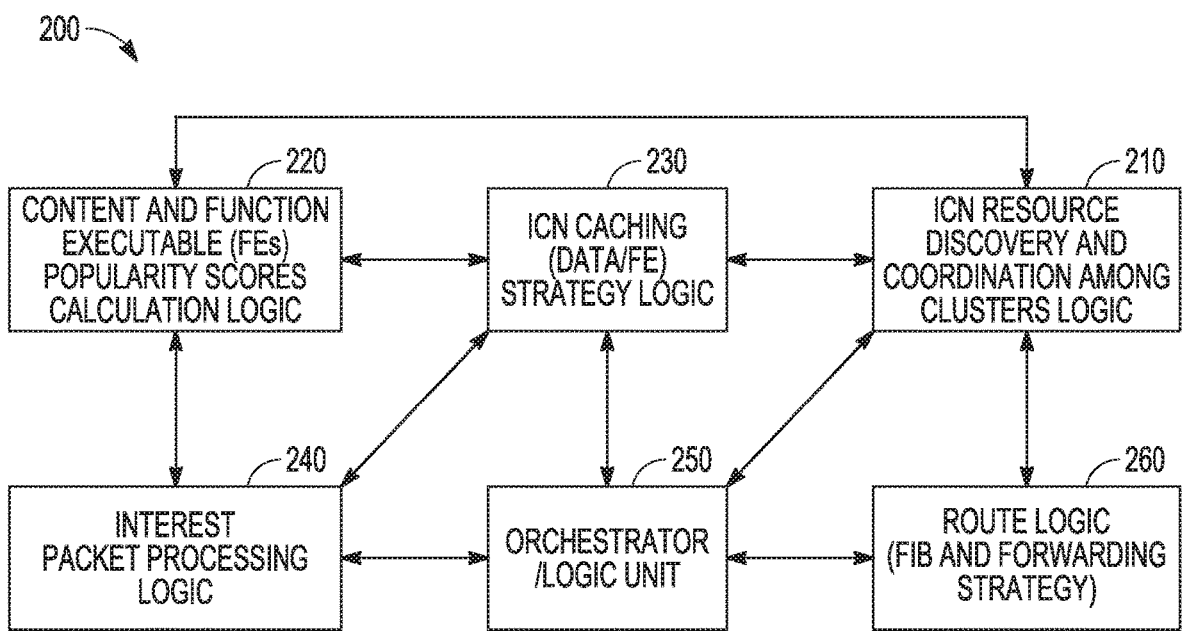
FIG. 2 illustrates a sample embodiment of a framework enabling a cluster head (CH) to function as an orchestrator and coordinator for efficient caching, routing, and computing in an ICN network.

FIG. 2 illustrates a sample embodiment showing the major blocks/modules of a framework 200 implemented by a cluster head node that enables the cluster head node to function as an orchestrator and a coordinator for efficient caching, routing, and computing in an ICN as well as for co-existence of ICN and IP nodes in the network. As illustrated in FIG. 2, the major blocks/modules include ICN Resources Discovery and Inter-Cluster Coordination Logic 210, Content and Function Executables (FEs) Popularity Scores Calculation Logic 220, ICN Caching (Data/FE) Strategy Logic 230, Interest Packet Processing Logic 240, Orchestrator/Logic Unit 250, and Routing Logic 260, each of which is described below.

ICN Resources Discovery and Inter-Cluster Coordination Logic 210

In sample embodiments, each cluster head (CH) collects an aggregated report for its cluster including information such as cached content (cached or produced), cached Function Executables (FEs), forwarding information base (FIB) entries to reach contents and FEs beyond the cluster, popularity scores perceived/calculated for contents and FEs, available remaining cache capacity, computational capabilities, and the like. This report is provided by the ICN Resources Discovery and Inter-Cluster Coordination Logic 210 and is referred to herein as the Inter-Cluster-ICN-Coordination-Information Report. The CH periodically and frequently shares the Inter-Cluster-ICN-Coordination-Information Report among neighboring clusters. A full report may be shared for a longer period, while an incremental report (say Inter-Cluster-ICN-Coordination-Information with only the most popular content and recently changed info) may be shared in between full reports.

Content and Function Executables Popularity Scores Calculation Logic 220

The CH frequently determines the popularity of content and function executables in the cluster, as well as in their proximity. In sample embodiments, a learning algorithm of the Content and Function Executables Popularity Scores Calculation Logic 220 determines the popularity scores based on one or more input features such as the number of interests generated, time stamp, and location of the interests, history of other interests requested from the same producer, popularity score of the previous Interests from the producer, and popularity scores shared by neighboring CHs. The popularity calculation may be performed for all cached content/FEs in the cluster, as well as content/FEs in neighboring CHs (specified in the Inter-Cluster-ICN-Coordination-Information Reports) and content/FEs reachable based on FIB information shared by neighboring CHs in the Inter-Cluster-ICN-Coordination-Information Report. For example, if a CH sees a higher number of interests generated for a content $c_1$ over a sliding window of time, it will calculate a higher popularity score for content $c_1$. Similarly, if the CH knows that contents $c_2, c_3, \ldots$ from a producer P1 have higher popularity scores, a new content $c_n$ from producer P1 will get a higher popularity score. The CH may consider more than one factor to calculate the popularity score of a content, for example, popularity score=$a_1*factor_1+a_2*factor_2+ \ldots +a_n*factor_n$, where $a_1+a_2+ \ldots +a_n=1$. A learning algorithm (for example, machine learning algorithms like deep neural network (DNN), Deep Reinforcement learning (DRL), etc.) may also determine a Dependency Score of an FE on specific contents based on input features mentioned above and the number of Interests generated for a function to be executed on specific contents and vice-versa. The Dependency Score helps caching logic to cache an FE and associated content (with Dependency Score) either on the same node or on nearby nodes.

ICN Caching (Data/FE) Strategy Logic 230

Based on the most recent calculated values of the Content/FEs Popularity Scores and the FE-Content dependency (as indicated by their Dependency Scores), the ICN Caching (Data/FE) Strategy Logic 230 of the CH prepares the following lists:

New Content/FEs to be cached: These are new very popular content and FEs to be cached. In some cases, a cluster may have a content and want to cache a function which has a very high Dependency Score with the existing content and vice-versa.

Existing Content/FEs to be removed: Some of the already cached Content/FEs may remain no longer popular and may be removed.

Existing Content/FEs to be Relocated in Proximity: In coordination with neighboring CHs, some of content or FE may need to be relocated, e.g., to put FE and a content (with high Dependency Score) together or nearby.

Interest Packet Processing Logic 240

Whenever an interest packet arrives at a cluster member (CM), it starts a timer 'Wait-for-CH-to-Respond-Timer.' If the CH responds, the CM does not process the interest packet. However, if the CH does not respond to the interest packet before the timer expires, the CM may either respond (if it has requested content or function executable) or forward the interest packet to a next hop. On the other hand, if the interest packet arrives at a CH and the CH decides to act as an orchestrator for the interest packet, the CH takes actions such as modifying the interest packet to indicate itself as the orchestrator, or the CH may request other nodes/CHs for specific content/tasks. Otherwise, the CH may forward the interest packet to a next hop. The next hop may be calculated based on information it has collected in advance from neighboring CHs from the exchange of Inter-Cluster-ICN-Coordination-Information Reports.

Orchestrator Logic/Unit 250

A CH upon reception of an interest packet may decide to act as an orchestrator. For example, if the CH finds that the requested content and compute service are available in the proximity (based on information it has collected in advance from neighboring CHs from exchange of Inter-Cluster-lCN-Coordination-Information Reports), the CH may decide to act as orchestrator for this interest packet. As orchestrator, the CH takes actions such as modifying an interest packet to indicate itself as an orchestrator, and the CH may request other nodes/CHs for specific/partial content/tasks, decide efficient routing of requests to one or more nodes/CHs, ensure final response satisfies the request in the original interest packet, and send the response to a consumer.

Routing Logic 260

The forwarding information base (FIB) may be checked to identify a next node. Forwarding strategy may also be obtained from the original interest packet. Other ICN routing techniques may also be implemented as appropriate.

Authorization to Operate as a CH and to be a Cluster Member (CM) Node

There may be several criteria for determining cluster membership including, inter alia, proximity of a node to a CH, category or class that content member nodes are interested in, geographic location of nodes, performance characteristics, mobility characteristics, sensitivity of content accessed, physical or legal ownership of nodes, and the like. Establishing membership in a cluster may involve a registration step where the relevant criteria are established (such as through an onboarding, attestation or challenge-response protocol) and where a credential, token or certificate is issued containing the membership name and status. In some deployments, a group key may be used to establish membership in a cluster. Alternatively, group memberships may be added to a certificate or token that otherwise identifies the node individually.

CM nodes may participate in a cluster as members by authenticating interest and data packets using a certificate or group signing/message identification code (MAC) key. On the other hand, a token value that accompanies the interest or data packet in a packet parameter field may be used that is signed by a group manager (which could be the CH or other similar node).

Additionally, a CH may provide an additional role or privilege that may be granted to cluster member (CM) nodes. For example, an existing CM may be authorized to manage addition and/or deletion of cluster members. Cluster membership management may be another role for which a certificate or token may be granted using the mechanisms described above. A well-known membership management method may be established initially to begin an ICN deployment. The membership management may authorize a second membership management node through delegation and so forth until there are enough membership management nodes to accommodate the network. Membership management nodes also may grant CH privileges as mentioned above. A membership management node may double as a CH node where motivated by performance and convenience.

In a complex network comprising multiple CH nodes and membership communities, inter-cluster interactions may be authorized by enrolling nodes into multiple clusters as first-class members. The node may ensure the packet may traverse multiple clusters by signing multiple times (with keys associated with the expected clusters to be traversed) or by listing the multiple cluster memberships in a certificate or token that is signed by a common trust authority. On the other hand, the CH may allow nodes from peer clusters to authenticate by authoring a policy that recognizes peer clusters and where verification logic allows nodes authenticated to a peer cluster. CH policy may also allow anonymous nodes to authenticate, which may avoid unnecessary signature checks.

In sample embodiments, cluster policies may be represented in a Named Function Network (NFN) containing cluster specific enforcement rules. The NFN may be authored, signed, and distributed according to the normal practice of an NFN and/or ICN as a way to simplify bootstrapping of a new CH, membership management node, or other node that must enforce a cluster specific policy.

Coordination Among Proximate Cluster Heads in a Cluster Based ICN

When the CH is registered to act as an orchestrator, a consumer sending an interest packet (request) for a content with a compute request on the requested data may encounter a CH on the route that is to act as a facilitator/orchestrator. The consumer may add a flag or a new field in the interest packet to provide explicit indication/permission for the CH to act as a facilitator/orchestrator. On the other hand, a CH may take the role of orchestrator within its own cluster members without any explicit indication from the consumer. However, in some embodiments, an explicit indication/permission from the consumer may be needed for a CH to act as orchestrator beyond its own cluster (e.g., multiple neighboring clusters in the neighborhood) to fulfill a consumer's request.

A CH registered as an orchestrator may generate one or more new request packets (special interest packets) to complete the task(s) indicated in the consumer's original request. For latency sensitive content and a compute request, the orchestrator CH also may send duplicate requests simultaneously towards two or more potential neighboring CHs for the requested content (and/or compute services).

Figure 3:
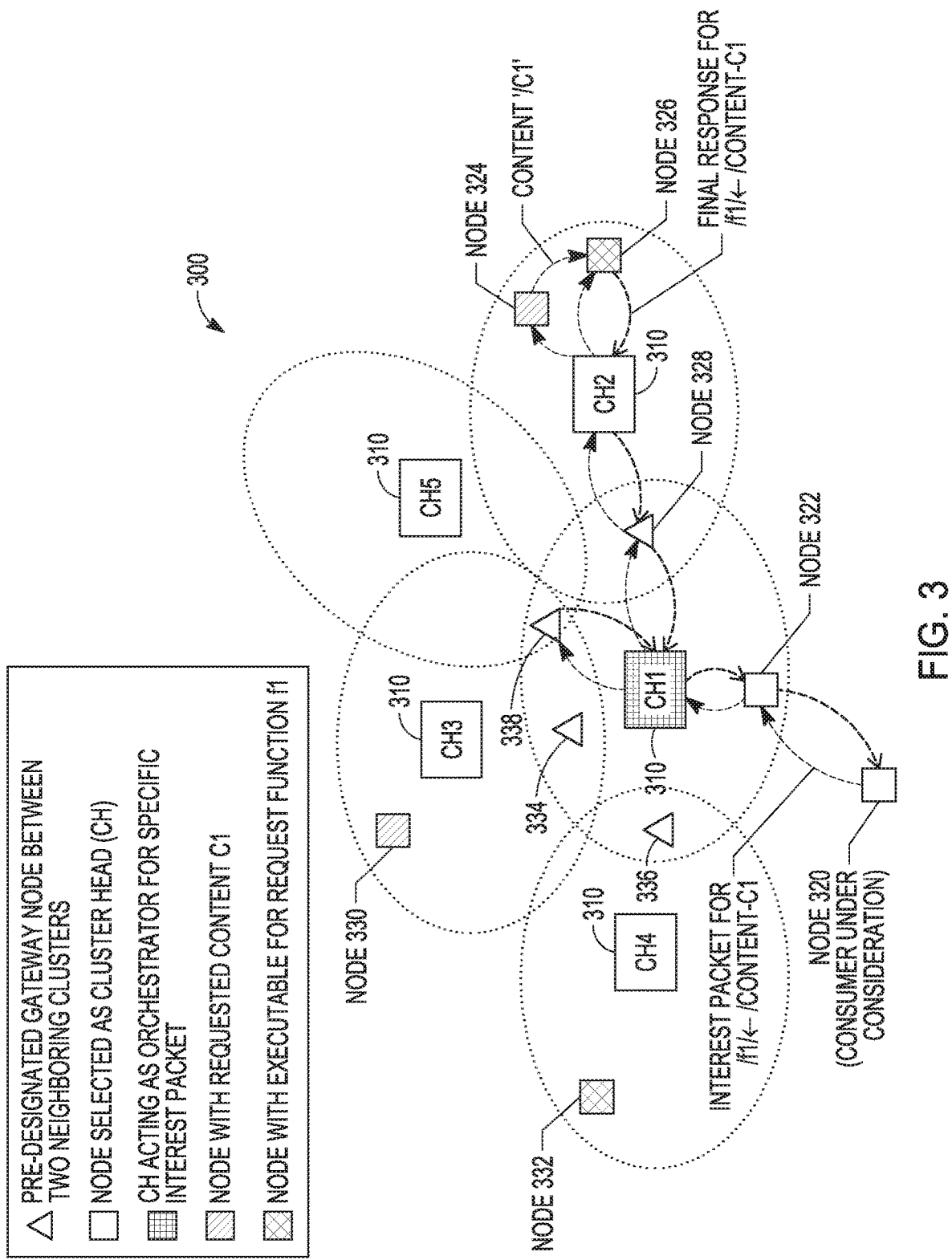
FIG. 3 illustrates an example showing the major steps of ICN based content retrieval and compute service assisted by a CH registered as an orchestrator.

FIG. 3 describes an example showing the major steps of an ICN based content retrieval and compute service assisted by a CH registered as an orchestrator. In the example of FIG. 3, the ICN 300 includes nodes 310 selected as CHs (e.g., CH1, CH2, CH3, CH4, and CH5) in a proximity so as to periodically and frequently share an Inter-Cluster-ICN-Coordination-Information Report including available content caching, function executables caching in their clusters and associated performance scores such as estimated content retrieval latency, compute time for associated function executable, whether a functional executable is allowed to be downloaded by other nodes, and the like. As indicated in FIG. 3, a consumer (node 320) sends an Interest packet for content C1 and also requests to perform function f1 on content C1 (/f1/←/Content-C1). CH1 receives the interest packet through a cluster member (CM) node 322. CH1 then checks whether the request may be served by members in Cluster 1 or by its neighboring clusters (based on Information CH1 has collected in advance from neighboring CHs from exchange of inter-Cluster-ICN-Coordination-Information Reports). If CH1 determines that its proximity clusters are able to serve the request, CH1 takes the role of orchestrator for this Interest packet. Otherwise, CH1 will forward the interest packet to a next-hop CH.

If CH1 accepts the request to be an orchestrator, CH1 then runs an algorithm to determine routing. The algorithm selects routing in a way to ensure a higher cumulative key performance indicators score (C-KPI-Score) for content C1 retrieval and execution of function f1. For example, the C-KPI-Score may depend on content retrieval latency, function execution latency, communication links qualities on the path, and the like. In this example, CH1 may have following information:

| Content | (Proximity Location, C-KPI-Score) | |
|---|---|---|
| C1 | (CH2, 3) | (CH3, 4) |
| ... | | |
| Function Executable | (Proximity Location, C-KPI-Score, transferable to other nodes) | |
| f1 | (CH2, 5, no) | (CH4, 4, no) |
| ... | | |

In sample embodiments, a C-KPI score also may be calculated using a machine learning algorithm such as deep neural network (DNN), Deep Reinforcement learning (DRL), etc. The input features for learning would be the content attributes, node attributes, the routing and execution latency, the link qualities, and the like. An adaptive algorithm could be executed since some of the attributes may dynamically change (e.g. link qualities, node locations, etc.).

Based on the information available to it, CH1 may select CH3 for content C1 if an interest packet for only C1 retrieval comes as the C-KPI-Score is higher. However, in this example, since a function f1 also needs to be performed, CH1 selects CH2 as it has both content c1 and function f1 executable at nodes 324 and 326, respectively. By doing so, CH1 minimizes the cost of moving content to the node with the function f1 executable. It should be recognized that, in some cases, the content and function executable may be in two different neighboring clusters.

In the example of FIG. 3, CH1 forwards the updated interest packet to CH2 via a pre-designated gateway node 328 if CH2 cannot be reached in 1-hop. The updated interest packet may contain original consumer information, an indication of CH1 as orchestrator, and a list of content/tasks requested from CH2 (or CH2's cluster). It is noted that the updated interest packet may be forwarded as unicast to reduce signaling overhead. CH2 now directs node 324 to forward content to node 326 as the function executable is not allowed to be moved to other nodes (e.g., due to trust/security, pay, or other issue). CH2 also indicates that node 326 is to receive content C1 from node 324 and to perform function f1 on C1. The final response is sent back to the orchestrator CH1 via node 328. The orchestrator CH1 then collects all the responses (if it has requested contents/tasks from various clusters/CHs) and sends the aggregated response to the consumer node 320. Similar processes may be followed to process interest packets destined for node 330 of CH3, node 332 of CH4, or CH5 via gateway nodes 334, 336 or 338, respectively.

Figure 4:
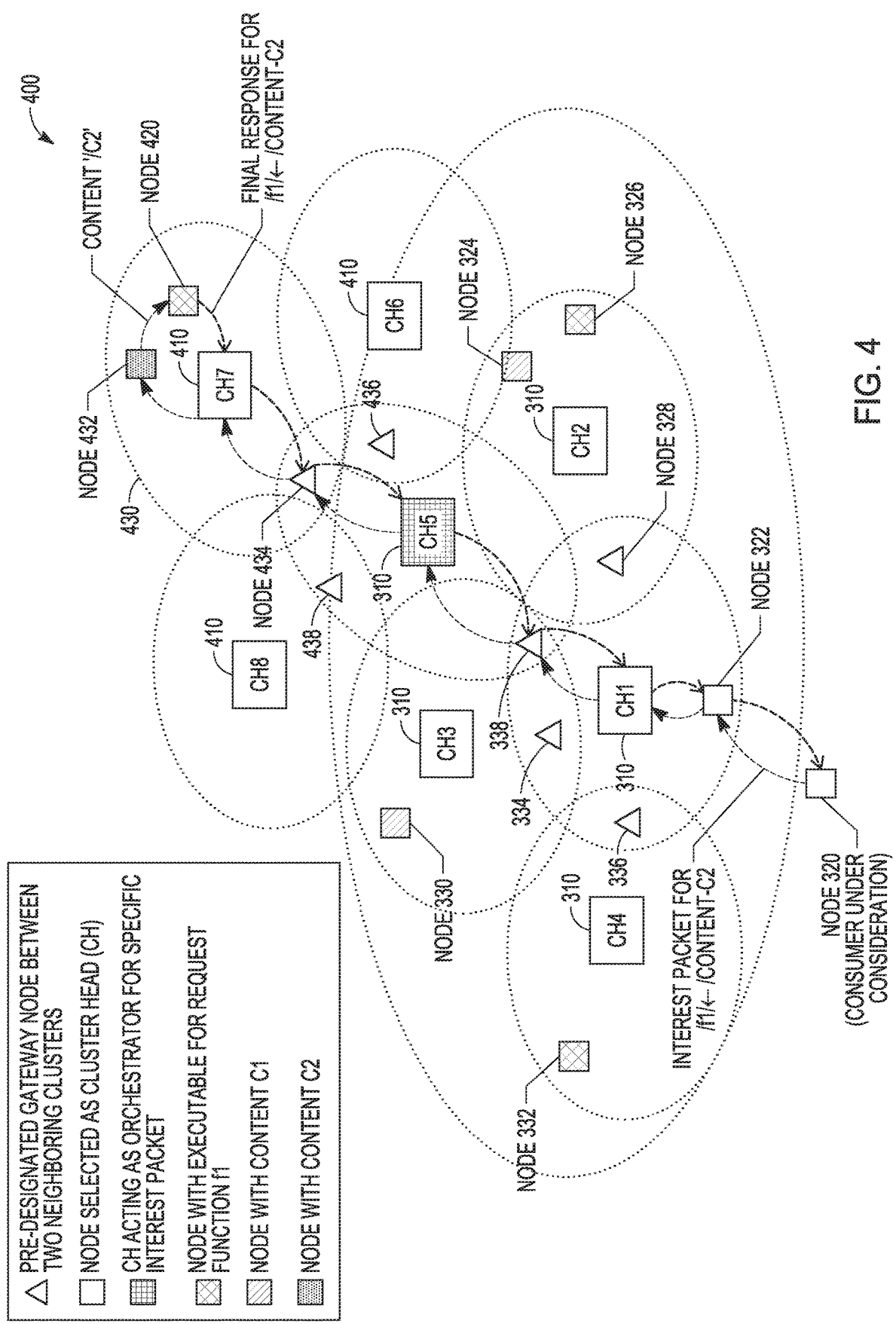
FIG. 4 illustrates another example of ICN based content retrieval and compute service assisted by a CH as an orchestrator.

FIG. 4 illustrates another example of an ICN based content retrieval and compute service assisted by a CH as an orchestrator. In the example of FIG. 4, the ICN 400 includes nodes 310 (CH1, CH2, CH3, CH4, CH5) from FIG. 3 as well as nodes 410 selected as CHs (e.g., CH6, CH7, and CH8) in a proximity so as to periodically and frequently share an Inter-Cluster-ICN-Coordination-Information Report including available content caching, function executables caching in their clusters and associated performance scores such as estimated content retrieval latency, compute time for associated function executable, whether functional executable is allowed to be downloaded by other nodes, and the like. As indicated, a consumer (Node 320) sends an interest packet for content C2 and also requests to perform function f1 on content C2 (/f1/←/Content-C2). In this example, CH1 receives the interest packet from node 322 with a request for content C2 (large data size) with compute function f1 to be executed on C2 to get a final response. Orchestrator Logic on CH1 runs an algorithm to see whether CH1 may act as orchestrator for this interest. CH1 realizes that content C2 is not in its proximity (immediate neighboring cluster), although f1 is in immediate proximity at node 332 or node 326. However, by inter-cluster coordination and sharing of FIB tables, CH1 knows that CH5 may reach content C2 and the node 420 with f1, so CH1 forwards the interest packet to CH5.

In ICN 400, it is assumed that the clusters share their FIB tables frequently. This enables CH1 to know in advance where to forward the interest packet without flooding. Here, C2 is not very popular content. Therefore, CH1 simply adds a FIB entry to reach C2 during a FIB report exchange with CH5 rather than caching C2 in CH1. Moreover, content C2 and the function f1 executable are in the same cluster 430. Because CH assisted caching of a function executable and the contents on which this function is executed is encouraged either on the same node or on nearby nodes to reduce communication resource wastage in moving content to function executable, cluster 430 is preferred. CH5 thus takes the role of orchestrator as it finds C2 and f1 in its proximity in cluster 430 and gets the final response via gateway node 434 in a similar way as described in the example described above with respect to FIG. 3. The content C2 is obtained from node 432 and the response is forwarded to the consumer node 320. Additional gateway nodes 436 and 438 provide access to CH6 and CH8, respectively, for similar processing.

In another embodiment, if the request from consumer node 320 is for latency sensitive services (content retrieval and/or computation), the orchestrator (CH1) may utilize various CHs for duplicate tasks. The earliest received response at the orchestrator CH1 is then sent back to the consumer node 320.

Cluster Head Assisted Co-Existence of ICN and IP

As another example, a CH may be used as a facilitator/orchestrator to enable the co-existence of ICN and IP based network layers in the network. In this example, the CH assists in IP/ICN coexistence by selecting a node with dual network protocols (ICN and IP) support as the CH. An adaptation layer between the ICN and the IP at a dual network protocol node receives interest packets (or a request for a content) on one protocol stack ICN (or IP) and retrieves content on the other network protocol IP (or ICN). The adaptation layer keeps track of the conversion of the request from one protocol to another so that after getting back a response and/or content, the CH may send the response to the consumer node on the same protocol as that of the request sent by consumer node. Thus, each node sends an interest packet or content request always to the CH (or to a pre-designated dual stack cluster member selected by the CH). The CH then gets content either on the ICN based protocol or the IP based protocol and the CH then sends back the response to the consumer/requester on the same protocol.

Timed Anonymization/Data Substitution for Data Protection in ICNs

Privacy Regulations such as the European Union's General Data Protection Regulations (GDPR) require that retention of Personally Identifiable Information (PII), such as name, location data, race, or online identifier like IP address, be limited in time and not retained for an indefinite period. Digital Rights Management (DRM) may also require time limited use of data. Deleting all records associated with an individual's PII may be damaging to business operations such as trend analysis or accounting. However, simply substituting a different value for PII after a certain time may achieve privacy requirements regarding retention times while keeping the integrity of operations. In an Information Centric Network (ICN), PII or other sensitive data may be cached in routers and administrators may forget to anonymize data past a defined retention time. Ideally, PII may be automatically anonymized or otherwise data substituted in an ICN at a given time while preserving the ability of data consumers in business operations to function while minimizing the amount of time that PII or other time sensitive controlled data is exposed to data consumers.

ICN implementations like Named Data Networking (NDN) have freshness options to time out data cached in routers and/or mark it as stale. Alternatively, the data producer may resend the data with PII or other sensitive information replaced with a random token or encryption version into the ICN network to update the cached versions into any consumer nodes. However, timing out PII data packets may cause problems with particular business operations, as critical parts of records could be missing. While the data producer may update the cache in downstream routers, there might be a network partition where the producer cannot reach the downstream router that has cached PII/sensitive data. Moreover, data producer administrators might simply forget to expire records.

This embodiment optimizes interest packet forwarding and processing operations of the ICN by introducing two new fields in the ICN router content store (CS) and in data packet metadata sent from the producer that specifies 1) the absolute (not relative) time after which the data expires and 2) new data to swap in its place after that point in time. A data producer would include these new fields when it wants data in NDN routers and consumers to be changed at a particular point in time.

As GDPR and other privacy regulations are becoming more and more common, this approach makes it much easier to deal with data retention networks in ICNs. The performance benefits of ICN may be retained while meeting privacy regulations or DRM in a much more efficient way. In addition, because of the data protection model of ICNs, the substitution may be done without an ICN router knowing anything about the contents of the data packet.

Figure 5:
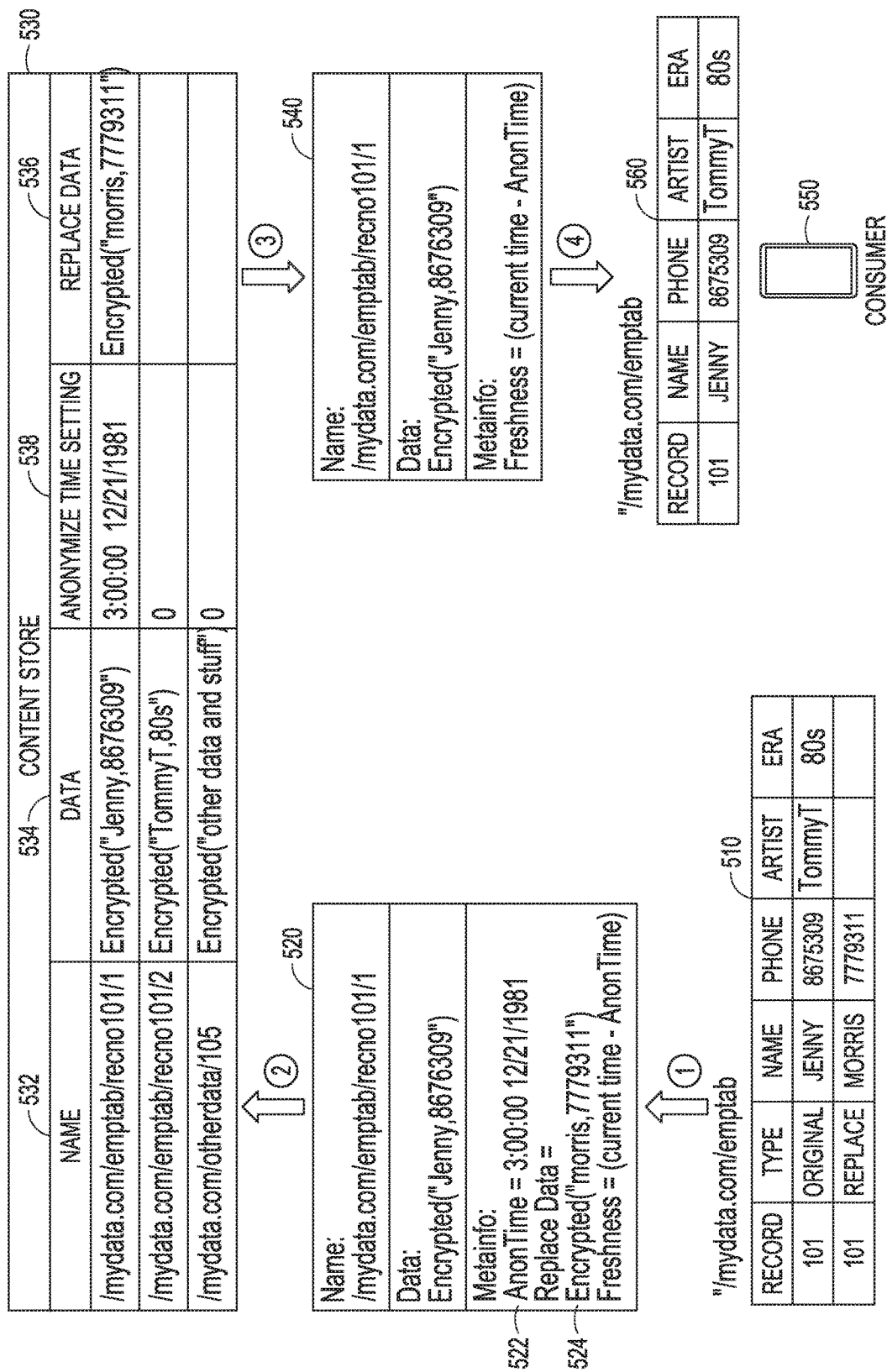
FIG. 5 illustrates the key components of a sample embodiment for implementing the two new fields in the content store for timed anonymization and data substitution for data protection in an ICN.

FIG. 5 illustrates the key components of a sample embodiment for implementing the two new fields in the content store for timed anonymization and data substitution for data protection in an ICN and also describes its operation before the substitution time in one possible implementation. In this example, a data producer 500 in an ICN has a data table ("/mydata/emptab") 510 with sensitive or PII data in it ("Jenny, phone 8675309"). When there is interest in this data, the data producer 500 puts the record portion for record 101 ("/mydata/emptab/recno101") with sensitive/PII Data into a data packet ("mydata/emptab/recno101") 520 that has the time when the sensitive data will be substituted (Anon-Time—3:00:00 Dec. 21, 1981) 522 with the replacement data (Replace Data—"morris, 7779311") 524. This is shown as Step 1 in which the data producer 500 sends a substitute string 524 with the data record's sensitive data and a time 522 to substitute the new data into an ICN data packet. NDN routers store this information in their content stores 530 at Step 2 with a freshness time set to expire at the replacement time. As illustrated, the content stores 530 may include the name of the data packet 520 at 532, the original sensitive data at 534, the replacement data at 536, and the time when the sensitive data will be substituted at 538.

Before the anonymization time setting expires, the data packets 540 going to an interested consumer are sent with the original sensitive data at Step 3. Before the anonymization time expires, the data consumer 550 receives the updated data stream 560 at Step 4.

Figure 6:
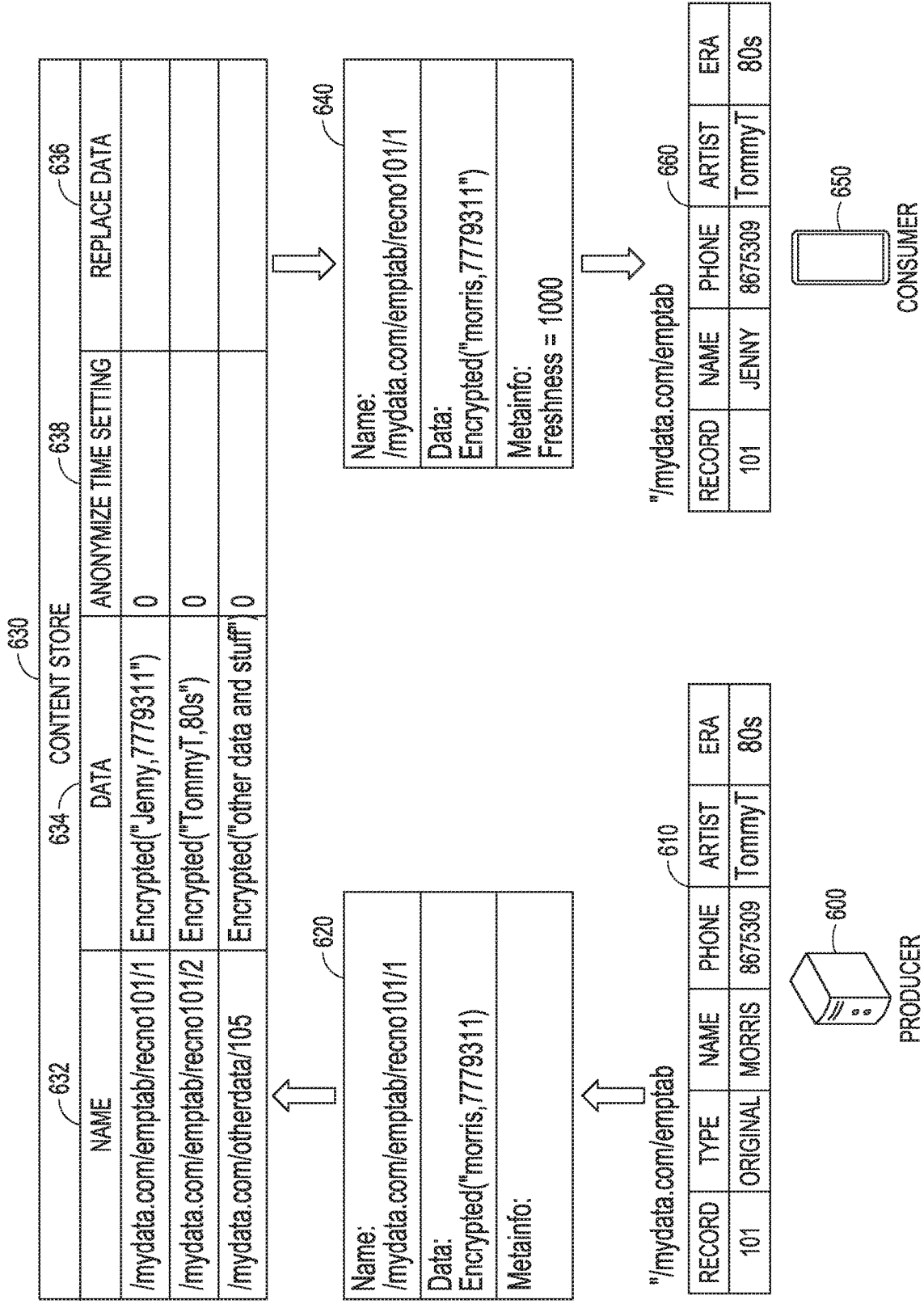
FIG. 6 illustrates the operation of the content store for timed anonymization and data substitution for data protection in an ICN after the data replacement time has been reached.

FIG. 6 illustrates the operation of the content store for timed anonymization and data substitution for data protection in an ICN after the data replacement time has been reached. In this example, the producer 600 provides encrypted PII data 610 in a data packet 620 that is provided to the content store 630 by an NDN router. As illustrated, the content store 630 may include the name of the data packet 620 at 632 and the provided data 610 at 634. The replacement data field 636 and the field 638 for the time when the sensitive data will be substituted are empty. In this example, the encrypted PII data is substituted with encrypted anonymized data inside of the content store 630 and the anonymization time is removed, a new freshness value is set, and the new anonymized/substituted data is provided in a data packet 640 that is sent to the data consumer 650 and is available for forwarding as the substitute string 660. The data producer also will change its own data to reflect the new values.

It is noted with respect to FIG. 6 that data record portions that do not have sensitive information (e.g. "TommyT, 80s") may be sent as regular data packets with no anonymization time or encryption strings. This is to reduce the overhead of the Replace Data 636. Another possible implementation is to have the router encrypt the data that is to be changed using a key obtained by any number of methods. Such an implementation reduces the overhead of storing the replacement string at the expense of adding more work to the router at the Anonymization Time.

Other techniques may be applied by those skilled in the art to make sure that there is sufficient diversity in the remaining non-sensitive data by, for example, measuring k-anonymity, l-diversity, t-closeness, etc., to assure that outside data cannot be correlated to reconstruct the sensitive data that was changed.

DRM Enforcement Using ICN

ICNs do not normally process and enforce DRM protected content. There are many DRM schemes for protecting content when distributed—these have been implemented into a variety of media like film, audio recordings, documents, e-books, and video games, using product keys, various encryption methods, and other techniques like persistent online authentication. While DRM protected content may be distributed over an ICN, it is further desired to leverage the capabilities of an ICN to make the DRM process more efficient and robust in the context of the ICN.

It is noted that participation among ICN routers and infrastructure nodes to support DRM Interest and routing processing does not imply that DRM protected metadata that may be used for these purposes will violate DRM controls. Rather, the ICN infrastructure nodes will become DRM participants for the purposes defined herein. For example, DRM metadata may include file and directory names, data location, data context that may include ownership, contributors, origination dates, expiration dates, intended audience, consumers or other intended users, use or recipients. Attestation data may be considered to be metadata. Other metadata may be linked to attestation data such that the provenance and other security properties of metadata may be proven according to the attestation data.

Also, DRM protected metadata used by an ICN for efficient ICN processing does not imply DRM protected content data rights are extended to ICN processing nodes authorized for metadata use and does not imply that content metadata contains a subset of content data. However, it may be expected that a hash or cryptographic integrity preserving value may be included in metadata as a means by which the DRM content consumer may verify the content data is intended for ICN processing using the specified metadata. Additionally, a hash of the DRM metadata may be included with the DRM data that proves the metadata was intended for use with the DRM data to perform ICN processing. Nodes authorized to view both DRM data and DRM metadata are able to verify the above intended bindings between metadata and data.

In sample embodiments, nodes in an ICN may show interest in data that is DRM protected. For example, the receiver may not be allowed to copy, forward, replay or modify the content. The originator may wish to control when the content is removed from the recipient's environment or she may want to post-process the data to aggregate, filter or otherwise modify the experience the data consumer has with the data. In this embodiment, the ICN is used to deliver DRM content to a consumer node containing a DRM engine that is trusted by the sender to apply DRM rules associated with the content using a DRM function that is either embedded in the DRM engine or supplied with the content. The DRM content, rules and function may be protected using cryptography by encrypting content and rules with a bulk encryption key (BEK) where the BEK is wrapped using the consumer's public encryption key. An ICN data packet containing DRM protected content is delivered to the consumer where the DRM engine processes the data.

The content originator may obtain the consumer's public key using the ICN by showing interest in the key. The content originator may also obtain attestation information about the DRM engine in a similar fashion using the ICN where the attestation data are associated with the DRM engine's identity.

Figure 7:
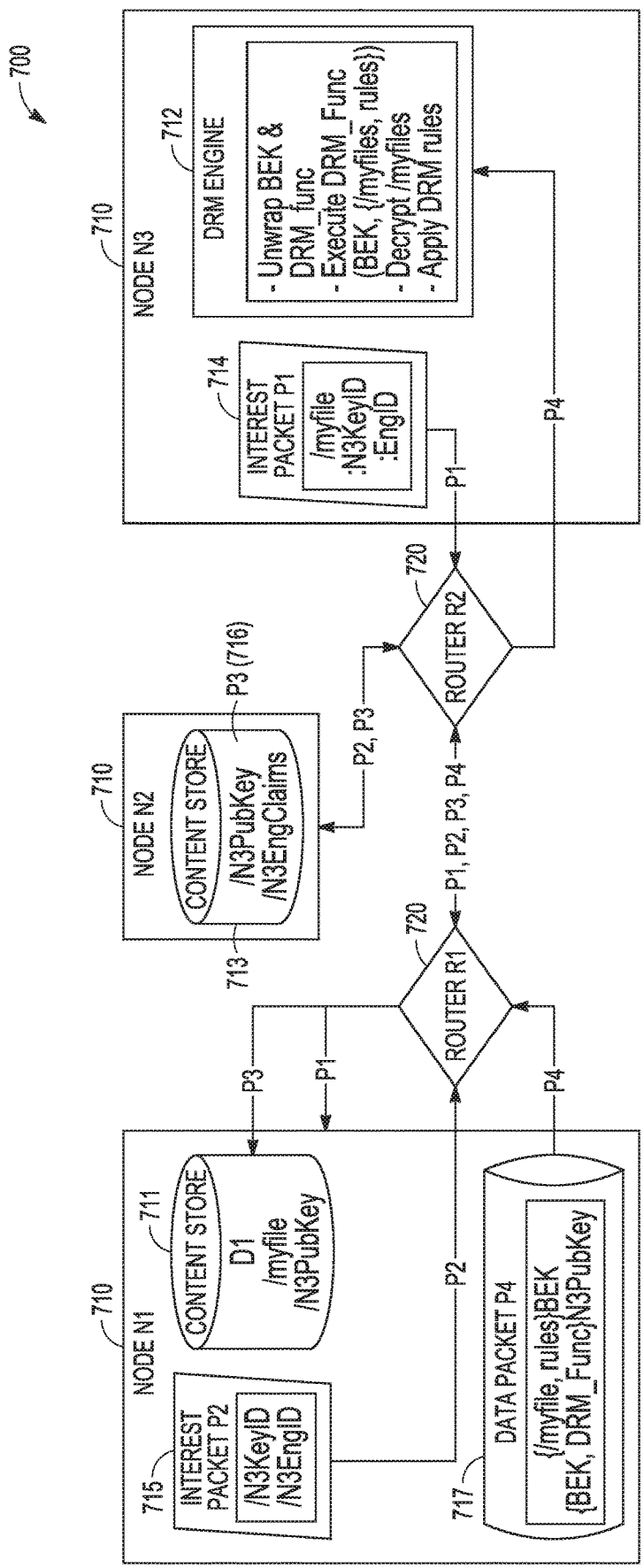
FIG. 7 illustrates an example ICN including ICN nodes (N1, N2, N3) and routing nodes (R1, R2) that provide digital rights management (DRM) Enforcement.

FIG. 7 illustrates an example ICN 700 including ICN nodes 710 (N1, N2, N3) and routing nodes 720 (R1, R2) that provide DRM Enforcement. Node N1 has content/myfile in its content store (CS) 711 that requires DRM processing when consumed by Node N3. Node N3 has a DRM engine 712 that N1 relies upon to do the DRM processing. Node N2 has information/N3PubKey and/N3EngClaims in its content store 713 that N1 needs to establish trust and security associations with N3. N1, N2, and N3 may be NDN routing nodes with their own pending interest table (PIT), forwarding information base (FIB), and CS, they may be producer or consumer nodes, or they may be a hybrid of both with specialized functions like a DRM engine and content store origination. R1 and R2 may be full ICN routers with their own PIT, FIB, and CS.

During operation, the nodes N1, N2, N3, R1, and R2 may implement the following steps to enforce the DRM processing by DRM engine 712:

Step 1: N3 shows interest in/myfile by creating an interest packet P1 714 including/myfile. N3 discovers that/myfile is DRM controlled when it discovers/myfile using a discovery device. For example, a secure NDN link state routing protocol may be adapted to enable such a discovery device. Each name link state advertisement (Name LSA) packet may contain a set of tuples, where each tuple includes a name indicating advertised data and a bit indicating DRM control. The routing table entries may be aggregated only if they share the same prefix and the same value for the DRM control bit. N3 therefore includes N3KeyID which refers to N3's public key used to receive DRM protected content. N3 also includes EngID which refers to attestable claims about N3's DRM engine.

Step 2: N3 sends the interest packet P1 714 to its ICN router R2. P1 contains/myfile, :N3KeyD, and:EngID, and may also contain an additional parameter/metadata indicating that this is a request for DRM controlled data, which may help any intermediate router enforce certain policies. R2 forwards P1 to R1, which in turn forwards P1 to N1. If R2 already has a PIT entry for/myfile and an entry in R2's own content store, then the interest request may be satisfied at R2 and the interest packet is consumed by R2.

Step 3: N1 reads the interest packet P1 and constructs an interest packet P2 715 in response that contains an interest in/N3KeyID (aka/N3PubKey) and/N3EngID (aka/N3EngClaims). N2 may play a role as a DRM support node where it may have these files in its content store 713. N2 may get these files by making another request for these contents beforehand, which gets propagated from N3 and cached in N2. Alternatively, N2 may act as a central repository containing public keys and engine claims of various nodes. Additionally, R1 and R2, as caching nodes, may also have DRM support files in their content stores.

Step 4: N1 sends the interest packet P2 715 to its Router R1, which forwards P2 to R2 which, in turn, forwards P2 to N2.

Step 5: N2 responds by returning the files/N3PubKey and /N3EngClaims in a data packet P3 716 that is routed via R2 and R1 to N1. In this example, N2 takes the role of a key distribution entity. It is noted that N2 hosted information may be encrypted as well. Otherwise, any router on the path may replace the N3PubKey and N3EngClaims with some fake key and claims, which leads N3 to never decrypt the data successfully. The content could also be eavesdropped if not encrypted.

Step 6: N1 processes/N3EngClaims against an attestation policy that determines that N3 has a DRM engine 712 that is trusted to process DRM content.

Step 7: N1 creates a DRM content suitable for N3 consumption by encrypting/myfile and any necessary DRM processing rules using a BEK that N1 generates. N1 wraps (encrypts) BEK and a DRM function (DRM_func) using N3's public key.

Step 8: N1 sends the DRM protected content blob to its ICN router R1 as a data packet P4 717. It is important to ensure that P4 has same name as P1 to make sure that interest packet P1 is getting served by P4. Also, between P1 and P4, P2 and P3 need to be exchanged. Hence, getting a response to P1 might take one additional RTT compared to regular interest/data packet exchange. Hence, the PIT expiry timer value for an interest packet requesting DRM content should be different (or at least doubled) compared to a regular interest packet. R1 forwards P4 to R2 and R2 forwards P4 to N3.

Step 9: N3 forwards the DRM content to its DRM Engine 712 where it unwraps the BEK and DRM_func. DRM Engine 712 executes the DRM function by passing BEK and the encrypted myfile (e.g. DRM_Func(BEK, {/myfile})). The DRM_Func decrypts/myfile using BEK and applies DRM rules contained inside. The results are returned from the DRM engine 712 to an application of N3.

In sample embodiments, it may be appropriate for routing nodes (R1, R2) to play a role in enforcing/facilitating the DRM content by performing any of the following additional steps:

Collecting attestation claims/N3EngClaims from N3 on a periodic basis and storing or caching the results in its content store. This allows convenient and quick access by N1 seeking to validate DRM engine environments.

Authenticating Nodes as authorized participants in a DRM content distribution network. For example, R2 might authenticate N3's public key/N3PubKey and approve it for use in the ICN 700. It may, for example verify the key length is sufficiently large or the algorithm is sufficiently safe.

Applying geo-fencing policies that prevent DRM content from being delivered to locations that may present a DRM cracking threat or may have legal constraints on distribution of the content.

Applying performance optimization polices that make context sensitive routing decisions based on DRM content exchange, SLAs affecting DRM content use, Processing of DRM content related telemetry or processing of accounting data resulting from DRM content use.

Congestion Control for Ubiquitous Witness Evidence Solicitation Protocol

In the "Ubiquitous Witness" case, when multiple witnesses issue and respond to similar evidence solicitation requests, the possibility of network congestion arises. Applications of the Ubiquitous Witness use case include automated driving and other IoT technology use cases. For example, as each witness forwards interest packets to the nearest witness, which, in turn, also forward interest packets to their nearest neighbors within the region of interest, this may cause a flood of interest packets clogging up the network. Similarly, as each witness responds to interest packets by forwarding their data to different neighbors, such forwarding is also likely to cause a flood of data responses to the interest packets. A solution to the potential congestion arising in the Ubiquitous Witness use case is desired. This embodiment provides a technique whereby the number of ICN scoped interest requests is minimized by providing new ways to solicit data from witnesses to any "incident" use case. Such minimization of interest requests, in turn, also minimizes the potentially high volume of data responses while guaranteeing regional coverage.

In sample embodiments, interest packet forwarding and processing operations of the ICN are optimized by limiting the number of scoped interest packets sent within the region of interest eliminating as many duplicated scoped interest packets that might be sent to a given node either by the originating node(s) or by aggregation nodes further down the path from the originating nodes and by limiting the number of duplicate data responses that might have been sent or would have been sent in response to the receipt of the scoped interest packets. As used herein, a scoped Interest packet is an Interest packet that queries for data within a certain delta of some reference time and location within the region of interest. Reference time may be a time when an accident occurred, and region of interest may be the area (road sections) around the accident location. The elimination of the duplicated scoped interest packets may be achieved in a number of ways. For example:

a) Suppression of scoped interest packets may be achieved by having a node randomly wait a certain amount of time before forwarding the scoped interest packets. A randomized timer value may be derived based on parameters such as the number of links with neighbors.

b) When multiple authorized solicitors of non-mobile ICN nodes are available, a few may be elected or clusters may be formed to parallelize the activity of collecting data, such as video.

c) Contextual suppression may be used to filter when the data would overwhelm the requestor. The data may be filtered on the front end or at an aggregation node to select streams based on some criteria, such as quality of the data, age of the data, view (angle of view) of a witnessed event, distance of a node (collecting data) from the event location, etc. Selected streams may also be used to enhance aggregated data by, for example, using selective stitching of 360-degree streamed data. Analytics may also be used to make selections.

d) Using a time-to-live field (TTL) with a pre-determined hop count for the region of interest within the interest packet to ensure that the same interest packet does not keep circulating about within the region of interest.

e) Limiting multiple responses for the same scoped interest packet may be used to ensure that the same data response is not sent to multiple nodes when multiple interest packets for the same content are received. Currently, in ICN, when a node receives an interest packet for the same content, it stores the interest packet in its pending interest table (PIT) if the content is not within its cache store and then forwards it. In this case, the node does not do that; instead the node deletes the interest packet.

f) An aggregation node may be provided with a function enabling it to figure out that it has received duplicate content (i.e., the same data response from two or more different nodes). The aggregation node may also have a timer to keep previously received information in its content store for a designated period of time.

g) A Bloom filter may be used in an interest packet to reduce the size of the interest packet so that it may be processed quicker.

Each of these techniques for eliminating the duplicated scoped interest packets will be addressed in more detail below.

Figure 8:
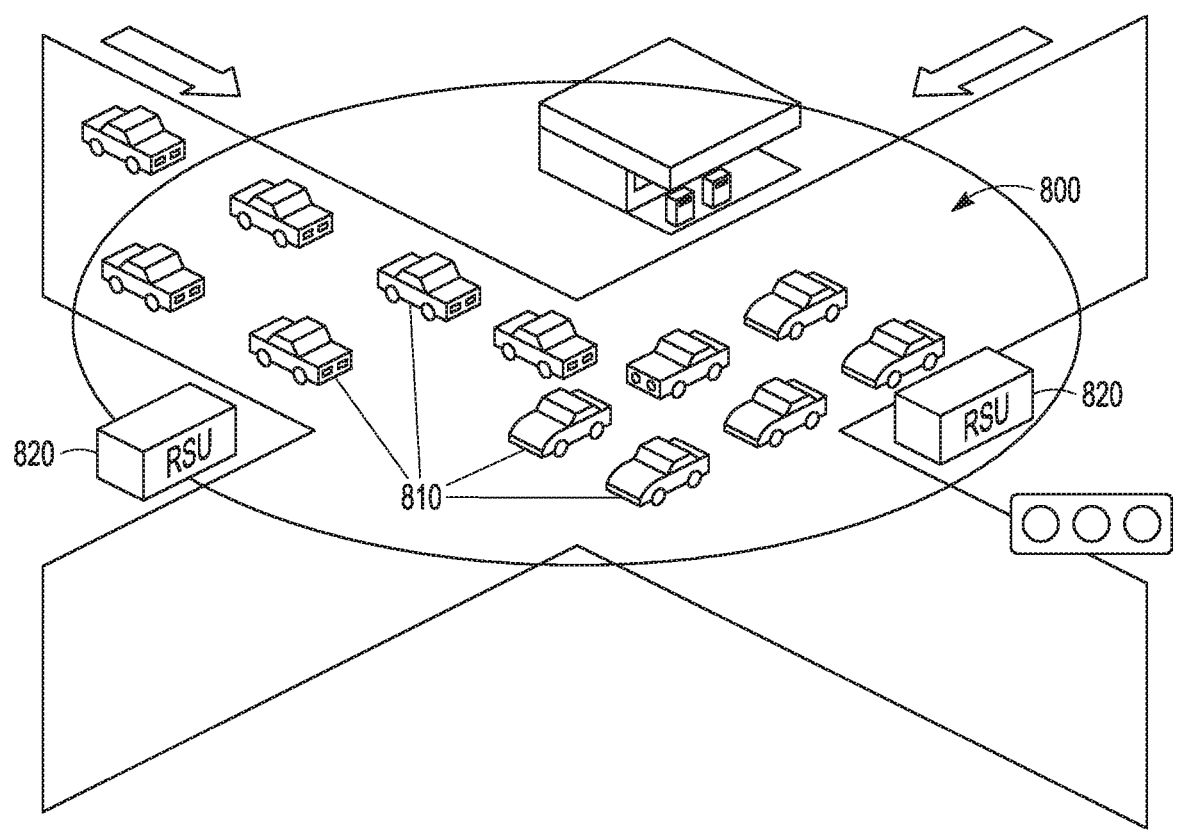
FIG. 8 illustrates a Region of Interest in a use case of the Ubiquitous Witness where an incident may have occurred (such as an automobile accident) that triggers an ICN node to solicit for evidence data from the witnesses to the incident.

FIG. 8 illustrates a Region of Interest 800 in a use case of the Ubiquitous Witness where an incident may have occurred (such as an automobile accident) that triggers an ICN node to solicit for evidence data from the witnesses to the incident. In this example, the respective vehicles 810 may each have nodes that are part of the ICN. Respective roadside units (RSUs) 820 may also be provided as part of the ICN. The ICN node(s) that trigger the evidence collection (vehicle node 810 or RSU 820) are referred to herein as originating node(s). It is assumed that these originating nodes have been given the authority to collect such evidence using a scoped interest packet that queries for data within a certain delta of some reference time and location within the region of interest and that the other ICN nodes within this region have a way to verify this. Different trust mechanisms may also be applied as would be apparent to those skilled in the art.

a) Controlled Dissemination of Scoped Interest Packets at Originating Node(s)

Not every ICN device that detects the anomaly or incident may trigger a scoped interest query or may have the authority to do so. Given that the illustrated example is a dynamic use case where the witnesses may be completely different at any given time and place, it is helpful for the system to designate some static or at least predetermined nodes that may be designated as the originating nodes for the evidence solicitation process. Electing such nodes a priori in a manner such that they are likely to reach different largely non-overlapping parts of the network topology for witness solicitation prevents multiple interests from being sent by all static nodes, which also allows the evidence gathering process to be parallelized. The election may take place through formation of clusters and identifying sections of the road/area topology to get the best possible data with the least amount of overhead.

b) Suppression Through Random Staggering of Forwarding the Scoped Interest Packets As the ICN nodes start to receive the scoped interest query, they in turn will forward the interest packets within the region of interest. Congestion may be reduced by having these intermediate nodes randomly wait for some time before forwarding the interest patent (if the interest packet otherwise meets the criteria for forwarding). Thus, some nodes that send the packet faster may cause their waiting neighbors to receive the scoped interest packet that they in turn were waiting to send. This may help the waiting node to skip the step of sending the interest packet to its waiting neighbors. Alternatively, instead of using a random wait timer, the timer value may be derived based on the number of neighbors the node is connected to or that may be listened to by the node.

c) Contextual Suppression

Different nodes within the region of interest 800 may have different camera views, some of which might be better in terms of the angle of view, the accuracy, etc. This type of contextual information may be derived by analyzing the first data sets at the originating nodes to better direct the scoped interest query to minimize redundancy. For example, a node X1 having a better angle of view, the desired accuracy/data quality, etc. may set up a short wait timer to respond. Neighbors, after listening to X1's response, will respond only if they have non-overlapping data (or a neighbor will process data to remove overlapping parts with X1's response before responding). In another embodiment, X1 may forward an Interest packet with a request for a remaining data part only (remaining data may be farther than 1-hop of X1).

d) Incorporating a Time-to-Live Field

In IP packets, there is a maximum time-to-live field that basically limits the number of hops the IP packet may be forwarded to. Similarly, there is a HopLimit count for an interest packet in ICN which prevents the endless looping of interest packets. However, for normal interest packets, this HopLimit count is reduced to 0 when the interest is satisfied. On the other hand, in the case of scoped interest packets, the HopLimit is reduced by 1 every time it gets forwarded. Otherwise, if no content is found (i.e., the interest packet falls outside its scope), then the HopLimit may be dropped. So, the scoped interest packet may be assigned a field with a certain value that depends upon a contextual knowledge of the intersection, for example, which allows the triggering node to set the value appropriately.

e) Limiting Multiple Responses for Same Scoped Interest Packet

Currently, it is possible in an ICN for the same data response to be sent to multiple nodes when multiple interest packets for the same content are received from different nodes. This is one of the performance optimizations of ICN where multiple queries from different consumers for the same content are answered from the same intermediate node rather than going to the source. In the Ubiquitous Witness case, however, sending duplicate responses will only further add to the congestion. There is an aggregation process going on and the assumption is that each requesting node is not soliciting data to independently consume it, but rather there is an intentional data collection process going on in service of a single query that involves multiple nodes. So, when an ICN node receives an interest packet for a specific content, it stores the interest packet in its PIT if the content is not within its cache store. Then, when there is data for the interest packet, the content is sent to each requesting node. In this case, the data responses are suppressed when they have already been sent to another node. For this to happen, each aggregating node maintains information regarding the last transfer of content for a given scoped query for a certain amount of time. Once the timer for retaining the information expires (say enough time has elapsed that another incident could happen again at the same site), then the information is flushed and the node may reply to a request for the same content.

Figure 9:
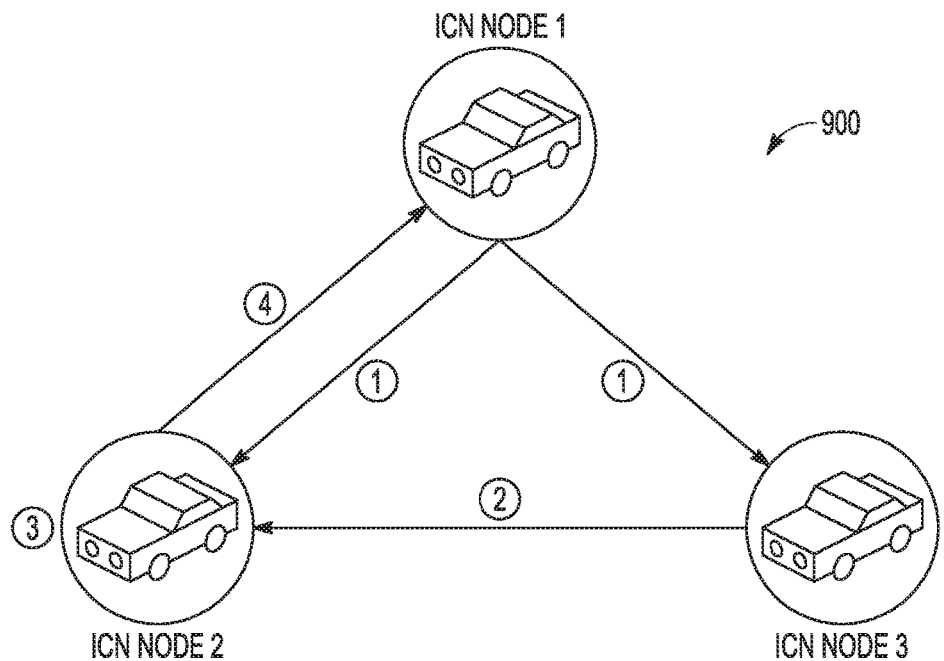
FIG. 9 illustrates an example implementation of duplicate response suppression.

FIG. 9 illustrates an example implementation of duplicate response suppression. As illustrated for a sample ICN 900 including Node 1, Node 2, and Node 3, at Step 1, a scoped interest packet query is provided from Node 1 to Nodes 2 and 3. At Step 2, the scoped interest packet query is forwarded from Node 3 to Node 2. At Step 3, Node 2 determines that duplicate interest packets have been received and replies to only one of them. For example, Node 2 may respond to the first query seeker and notes when it last responded to this interest packet. At Step 4, the reply with ICN data content is provided from Node 2 to Node 1 (since the interest packet from Node 1 was received before the duplicate interest packet from Node 3).

In addition, congestion may also be prevented by monitoring the lower layers such as the media access control (MAC)/physical (PHY) layers. If congestion is signaled, then the aggregating nodes may employ a leaky bucket scheme to release content slowly or more aggressively depending on the congestion state.

f) Computation Function to Detect Duplicate Data Response Packets

An aggregation node may be provided with a function or procedure that enables it to figure out that it has received duplicate content (i.e., the same data response) from two or more different nodes. The aggregation node may use the function to detect the duplicate content. A timer may also be used to keep previously received information on data responses for a set period of time. For example, an aggregation node may keep a record of content received for an Interest packet for a while after forwarding a content or part of the content to a next hop towards the originating node so that in the future if duplicate content arrives it may know it is duplicate based on the record of previously received contents.

g) Weighted Bloom Filter Interest

Bloom filters may be used in wireless beaconing packets to enlighten consumer nodes regarding available content. Consumer nodes intelligently select the router that may best service the request. Beacon packets are limited to a region of interest based on the radio range of the underlying wireless communication capability.

Figure 10:
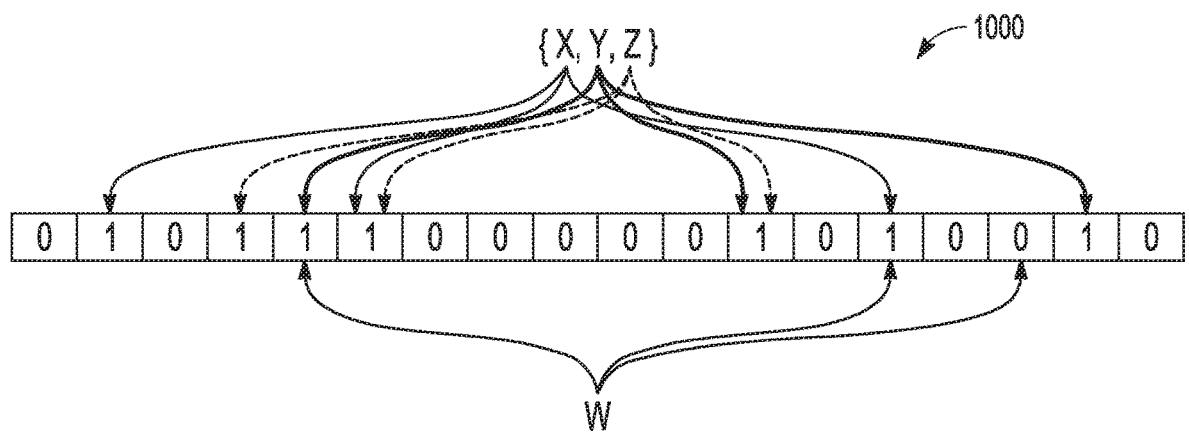
FIG. 10 illustrates a sample embodiment of a bloom filter representation of the content of interest packets.

FIG. 10 illustrates a sample embodiment of a Bloom filter representation 1000 of the content of interest packets. In sample embodiments, interest packets may contain a Bloom filter representation of content where x, y and z represent multiple content stores that may satisfy an interest request w. The consumer optimizes interest packets by combining multiple interest packets into a single packet containing multiple interests (w) that may be satisfied using the x, y and z content stores. Routing nodes maintain the Bloom filter representation of content stores reachable through the router. Additionally, given that the Bloom filter has a value of 1 (meaning the content is reachable from the current router), the cost to obtain the content is associated with each 1.

During use, the consumer presents w to the first router where it tries to find the intersection with the largest number of Is. The consumer may query multiple routers to find the best match. Wireless beaconing may be used to send the router's x, y, z Bloom filter to nodes within radio range without requiring the establishment of a connection. Consumer nodes easily snoop the Bloom filters from nearby routers, find the most complete intersection with w, and then select that router to process the interest packet with w. In cases where the maximum transmission unit (MTU) size of the underlying protocol allows weighted Bloom filters, the weights are also included so as to allow consumer nodes to do an additional comparison of weights to determine if an alternative router is a better choice for at least some of the content. If the network is congested, the consumer may elect to reduce w to select a router with higher x, y, z overlap and to select the router with the best performance for the contents in w.

Routing nodes may react to congestion by updating weights as non-local routes begin broadcasting longer wait times due to increased load. Since weights may be included in wireless beaconing headers, they serve as an early warning congestion notification system. If congestion reaches a maximum threshold, the router may update the x, y or z values in the Bloom filter to 0, which indicates that content is no longer available through that router. This forces consumers to select a different router as a way to provide load balancing.

Figure 11:
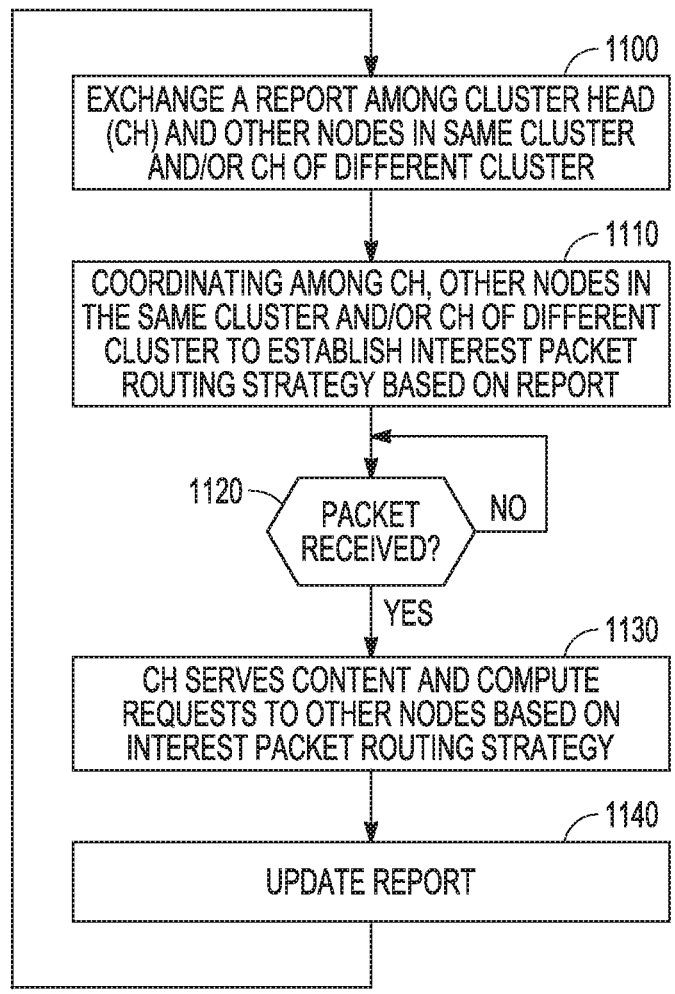
FIG. 11 illustrates a sample embodiment of a method for optimizing operations in an ICN network.

FIG. 11 illustrates a sample embodiment of a method for optimizing operations in an ICN network. As illustrated in FIG. 11, the method is implemented in a cluster head of a first cluster of nodes in an information-centric network (ICN). The cluster head is adapted to function as an orchestrator and coordinator for managing caching, routing, and computing of data in interest packets by other nodes in the first cluster and/or nodes in other clusters within the ICN as described herein. Other cluster heads in other clusters may implement similar functions by executing similar instructions. In the sample embodiments, the cluster head executes instructions to exchange a report at 1100 with at least one of the other nodes in the first cluster and a cluster head of a second cluster of nodes. The report includes aggregated data for the first cluster including cached content, cached Function Executables (FEs), forwarding information base (FIB) entries to reach contents and FEs beyond the first cluster, popularity scores for contents and FEs, available remaining cache capacity, computational capabilities, and the like. The cluster head then coordinates with the other nodes in the first cluster and/or the cluster head of the second cluster of nodes at 1110 to establish an interest packet routing strategy and cache management of content and FEs based on the aggregated data in the report. The cluster head of the first cluster then waits for an Interest packet at 1120. Upon receipt of an interest packet at 1120, the cluster head serves content and computes requests at 1130 to at least one of the other nodes in the first cluster and/or the cluster head of the second cluster of nodes based on the established interest packet routing strategy and cache management of content and FEs. The cluster head then updates the report at 1140 and repeats the exchanging, coordinating, and serving based on aggregated data in the updated report. The cluster head may optionally execute instructions to implement each of the other embodiments described herein. In this fashion, the cluster head manages processing based on the latest aggregated network data in the report to optimize operations of the ICN network.

Computing Architecture

Figure 12:
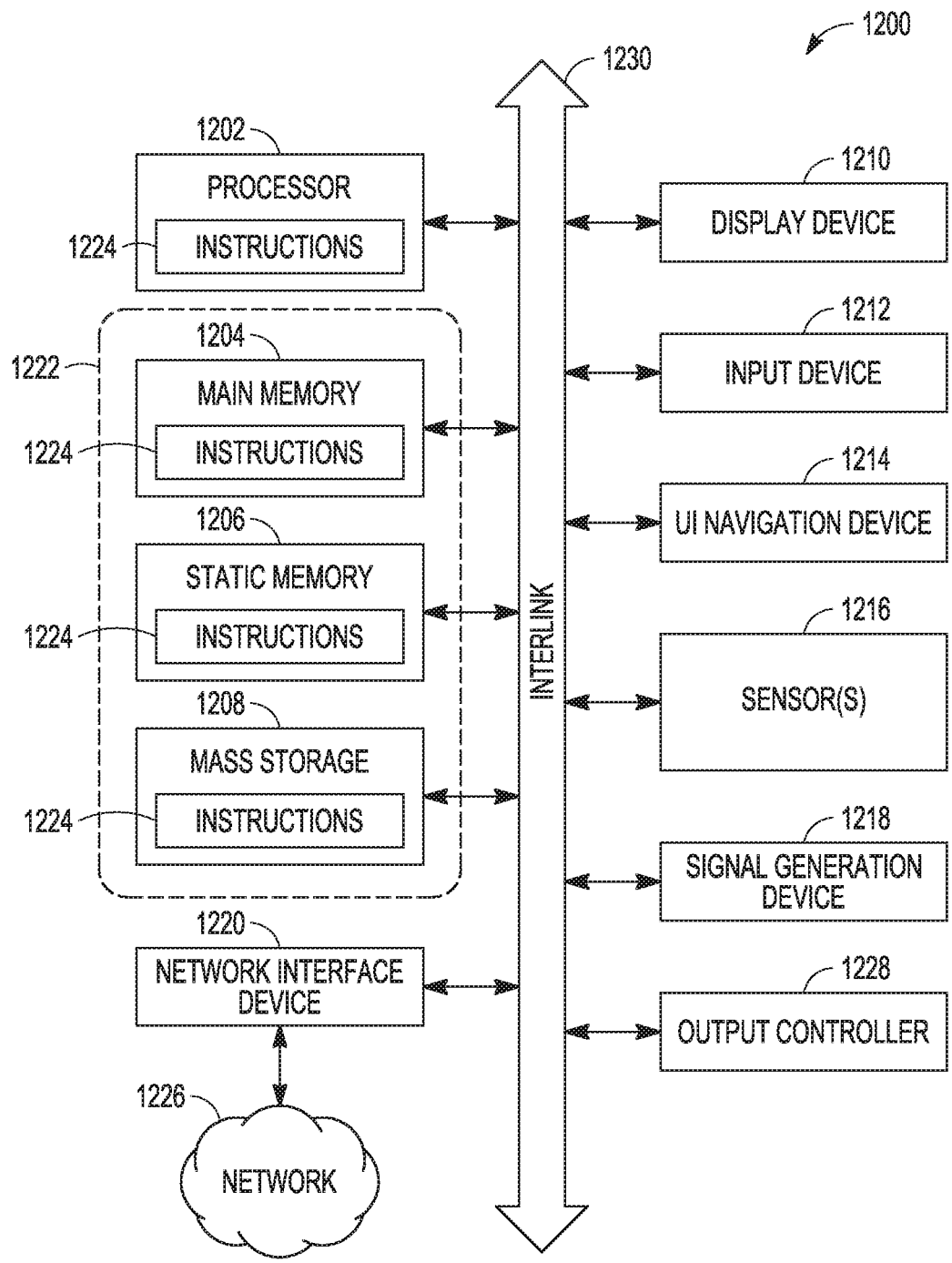
FIG. 12 is a block diagram illustrating an example of a machine upon which one or more embodiments may be implemented.

FIG. 12 illustrates a block diagram of an example machine 1200 upon which any one or more of the techniques (e.g., methodologies) discussed herein may perform. Examples, as described herein, may include, or may operate by, logic or a number of components, or mechanisms in the machine 1200. Circuitry (e.g., processing circuitry) is a collection of circuits implemented in tangible entities of the machine 1200 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1200 follow.

In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1200 may include a hardware processor 1202 (e.g., a central processing unit (CPU), a graphics processing unit (GPU), a hardware processor core, or any combination thereof), a main memory 1204, a static memory (e.g., memory or storage for firmware, microcode, a basic-input-output (BIOS), unified extensible firmware interface (UEFI), etc.) 1206, and mass storage 1208 (e.g., hard drive, tape drive, flash storage, or other block devices) some or all of which may communicate with each other via an interlink (e.g., bus) 1230. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1208, a signal generation device 1218 (e.g., a speaker), a network interface device 1220, and one or more sensors 1216, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1202, the main memory 1204, the static memory 1206, or the mass storage 1208 may be, or include, a machine readable medium 1222 on which is stored one or more sets of data structures or instructions 1224 (e.g., software) embodying or utilized by any one or more of the techniques or functions described herein. The instructions 1224 may also reside, completely or at least partially, within any of registers of the processor 1202, the main memory 1204, the static memory 1206, or the mass storage 1208 during execution thereof by the machine 1200. In an example, one or any combination of the hardware processor 1202, the main memory 1204, the static memory 1206, or the mass storage 1208 may constitute the machine readable media 1222. While the machine readable medium 1222 is illustrated as a single medium, the term "machine readable medium" may include a single medium or multiple media (e.g., a centralized or distributed database, and/or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may be further transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi, IEEE 802.16 family of standards known as WiMax®), IEEE 802.15.4 family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes transitory digital or analog communications signals or other non-transitory intangible media to facilitate communication of such software. A transmission medium is a machine-readable medium.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass a tangible hardware and/or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Certain embodiments are described herein as numbered examples 1, 2, 3, etc. These numbered examples are provided as examples only and do not limit the subject technology.

Example 1 is a computer-implemented method for coordinating the functions of a plurality of clustered nodes in an information-centric network (ICN), comprising: exchanging, by a cluster head, a report with at least one other node in a first cluster and a cluster head of a second cluster of nodes, the report including aggregated data for the first cluster of nodes, wherein the cluster head functions as an orchestrator and coordinator for managing caching, routing, and computing of data in interest packets by at least one of the other nodes in the first cluster and nodes in the second cluster of nodes; and coordinating, by the cluster head, with the at least one of the other nodes in the first cluster and the cluster head of the second cluster of nodes to establish an interest packet routing strategy and cache management of content and FEs based on the aggregated data in the report.

Example 2 is a method as in Example 1, wherein the aggregated data for the first cluster includes at least one of cached content, cached Function Executables (FEs), forwarding information base (FIB) entries to reach contents and FEs beyond the first cluster, popularity scores for contents and FEs, available remaining cache capacity, and computational capabilities, further comprising upon receipt of an interest packet, serving, by the cluster head, content and compute requests to at least one of the other nodes in the first cluster and the cluster head of the second cluster of nodes based on the established interest packet routing strategy and cache management of content and FEs; updating the report; and repeating the exchanging, coordinating, and serving based on aggregated data in the updated report.

Example 3 is a method as in any preceding Example, further comprising selecting as the cluster head of the first cluster of nodes a node that supports ICN and internet protocol (IP) network layer protocols and includes an adaptation layer between the ICN and IP network.

Example 4 is a method as in any preceding Example, further comprising receiving an interest packet or a request for content on one of the ICN and IP network, providing the interest packet or request for content through the adaptation layer, retrieving content from the other of the ICN and IP network, and providing the retrieved content to the one of the ICN and IP network.

Example 5 is a method as in any preceding Example, further comprising sending, by each node in the first cluster, an interest packet or a content request to an orchestrator node in the first cluster to determine which node in the first cluster supports co-existence of the ICN and IP network layer protocols, obtaining, by the cluster head, content either on the ICN or the IP network to optimize a cumulative key performance indicators score (C-KPI-Score), whereby the C-KPI-Score depends on at least one of content retrieval latency, function execution latency, and communication links qualities on the optimized route, and sending back a response to a requesting node on a same network layer protocol as that of the interest packet or content request sent by the node that sent the content request for which the response is being sent.

Example 6 is a method as in any preceding Example, further comprising calculating, by the cluster head from aggregated data in the report, popularity scores for cached content and FEs in the first cluster, cached content and FEs in the second cluster, and content and FEs reachable in the ICN from the first cluster based on forwarding information base (FIB) data shared by the cluster head of the second cluster of nodes.

Example 7 is a method as in any preceding Example, wherein calculating the popularity scores comprises a learning algorithm determining the popularity scores based on at least one input feature selected from a group of features comprising number of interests generated, time stamp and location of the interests, history of other interests requested from a producer of interests, popularity score of previous interests from the producer of interests, and popularity scores shared by the cluster head of the second cluster of nodes.

Example 8 is a method as in any preceding Example, further comprising calculating, by the cluster head, a dependency score of a function executable on specific contents in the first cluster and the second cluster based on a number of interests generated for the function executable on the specific contents in the first cluster and the second cluster.

Example 9 is a method as in any preceding Example, further comprising coordinating caching, by the cluster head, data and FEs in the first cluster and the second cluster based on most recent calculated values of content and FE popularity scores and FE-content dependency as indicated by an FE-content dependency score.

Example 10 is a method as in any preceding Example, further comprising, upon receipt of the interest packet by the cluster head, determining, by the cluster head, whether the cluster head is authorized and eligible to act as an orchestrator to serve the interest packet or is to forward the interest packet to a next-hop node based on the aggregated data in the report.

Example 11 is a method as in any preceding Example, wherein coordinating by the cluster head comprises selecting, using a learning based algorithm, at least one node in at least one of the first cluster and the second cluster of nodes for assigning tasks for serving an interest packet and determining an optimized route to the selected at least one node to optimize a cumulative key performance indicators score (C-KPI-Score), whereby the C-KPI-Score depends on at least one of content retrieval latency, function execution latency, and communication links qualities on the optimized route.

Example 12 is a method as in any preceding Example, further comprising generating and sending, by the cluster head, at least one unicast request packet to the selected at least one node via the optimized route, collecting responses to the unicast request packet from the at least one node, preparing an aggregated response, and sending the aggregated response to a consumer node for the aggregated response.

Example 13 is a method as in any preceding Example, wherein a node in the cluster of nodes starts a response timer upon receipt of the interest packet, and if the cluster head responds to the interest packet before the response timer expires, the node in the cluster of nodes does not process the interest packet, while if the cluster head does not respond to the interest packet before the response timer expires, the cluster head either responds or forwards the interest packet to a next hop.

Example 14 is a method as in any preceding Example, further comprising providing fields in the interest packet that specify an absolute time after which data in the interest packet expires and new data to swap in place of the data in the interest packet after the data in the interest packet expires.

Example 15 is a method as in any preceding Example, wherein the other nodes in the first cluster comprise content stores that store the interest packet fields specifying the absolute time after which data in the interest packet expires and new data to swap in place of the data in the interest packet after the data in the interest packet expires, further comprising swapping the new data in place of the data in the interest packet when the data in the interest packet expires.

Example 16 is a method as in any preceding Example, further comprising delivering, by the cluster head, DRM content to a consumer node containing a DRM engine that is trusted by the cluster head to apply DRM rules associated with the DRM content using a DRM function that is either embedded in the DRM engine or supplied with the content.

Example 17 is a method as in any preceding Example, further comprising encrypting the DRM content and the DRM rules with a bulk encryption key (BEK) where the BEK is wrapped using a consumer's public encryption key.

Example 18 is a method as in any preceding Example, further comprising obtaining a consumer's public key or attestation information about the DRM engine by showing interest in the consumer's public key or the DRM engine, respectively, via the ICN.

Example 19 is a method as in any preceding Example, wherein the ICN comprises a data packet originating node and an aggregation node, further comprising limiting a number of scoped interest packets sent within a region of interest within the ICN by eliminating duplicated scoped interest packets sent to given node in the ICN either by the originating node or by the aggregation node.

Example 20 is a method as in any preceding Example, wherein limiting the number of scoped interest packets sent within the region of interest within the ICN comprises having a node in the first cluster wait a certain amount of time determined by a randomized timer before forwarding a scoped interest packet.

Example 21 is a method as in any preceding Example, wherein limiting the number of scoped interest packets sent within the region of interest within the ICN comprises electing a few nodes in the ICN or forming a cluster to parallelize collection of data when multiple authorized solicitors of non-mobile ICN nodes are available.

Example 22 is a method as in any preceding Example, wherein limiting the number of scoped interest packets sent within the region of interest within the ICN comprises filtering requested data to select streams based on contextual information.

Example 23 is a method as in any preceding Example, wherein limiting the number of scoped interest packets sent within the region of interest within the ICN comprises using a time-to-live field (TTL) with a pre-determined hop count for the region of interest within the interest packet to ensure that a same interest packet does not keep circulating amongst nodes within the region of interest.

Example 24 is a method as in any preceding Example, wherein limiting the number of scoped interest packets sent within the region of interest within the ICN comprises limiting multiple responses for a same scoped interest packet by, when a node receives a second interest packet requesting a same content as requested by a first interest packet, deleting the second interest packet.

Example 25 is a method as in any preceding Example, wherein limiting the number of scoped interest packets sent within the region of interest within the ICN comprises determining, by an aggregation node, that the aggregation node has received duplicate content from two or more different nodes and discarding duplicate content.

Example 26 is a method as in any preceding Example, wherein limiting the number of scoped interest packets sent within the region of interest within the ICN comprises using a Bloom filter in the interest packet to reduce the size of the interest packet.

Example 27 is an information-centric network (ICN) that coordinates the functions of a plurality of clustered nodes, comprising a first cluster of nodes comprising a first cluster head and a second cluster of nodes comprising a second cluster head, wherein the first cluster head functions as an orchestrator and coordinator for managing caching, routing, and computing of data in interest packets by at least one of other nodes in the first cluster and nodes in the second cluster, the first cluster head executing instructions for exchanging a report with at least one of the other nodes in the first cluster and the second cluster head, the report including aggregated data for the first cluster, and the first cluster head executing instructions for coordinating with the at least one of the other nodes in the first cluster and the second cluster head to establish an interest packet routing strategy and cache management of content and FEs based on the aggregated data in the report.

Example 28 is an ICN as in Example 27, wherein the aggregated data for the first cluster includes at least one of cached content, cached Function Executables (FEs), forwarding information base (FIB) entries to reach contents and FEs beyond the first cluster, popularity scores for contents and FEs, available remaining cache capacity, and computational capabilities, and wherein the first cluster head, upon receipt of an interest packet, serves content and compute requests to at least one of the other nodes in the first cluster and the second cluster head based on the established interest packet routing strategy and cache management of content and FEs, updates the report, and repeats the exchanging, coordinating, and serving based on aggregated data in the updated report.

Example 29 is an ICN as in Examples 27 and 28, wherein the first cluster head is a node that supports ICN and internet protocol (IP) network layer protocols and includes an adaptation layer between the ICN and IP network.

Example 30 is an ICN as in Examples 27-29, wherein the first cluster head receives an interest packet or a request for content on one of the ICN and IP network, provides the interest packet or request for content through the adaptation layer, retrieves content from the other of the ICN and IP network, and provides the retrieved content to the one of the ICN and IP network.

Example 31 is an ICN as in Examples 27-30, wherein each node in the first cluster sends an interest packet or a content request to an orchestrator node in the first cluster to determine which node in the first cluster supports co-existence of the ICN and IP network layer protocols, and the first cluster head obtains content either on the ICN or the IP network to optimize a cumulative key performance indicators score (C-KPI-Score), whereby the C-KPI-Score depends on at least one of content retrieval latency, function execution latency, and communication links qualities on the optimized route, and a node in the first cluster sends back a response to a requesting node on a same network layer protocol as that of the interest packet or content request sent by the node that sent the content request for which the response is being sent.

Example 32 is an ICN as in Examples 27-31, wherein the first cluster head calculates from aggregated data in the report the popularity scores for cached content and FEs in the first cluster, cached content and FEs in the second cluster, and content and FEs reachable in the ICN from the first cluster based on forwarding information base (FIB) data shared by the second cluster head.

Example 33 is an ICN as in Examples 27-32, wherein the first cluster head calculates the popularity scores using a learning algorithm that determines the popularity scores based on at least one input feature selected from a group of features comprising number of interests generated, time stamp and location of the interests, history of other interests requested from a producer of interests, popularity score of previous interests from the producer of interests, and popularity scores shared by the second cluster head.

Example 34 is an ICN as in Examples 27-33, wherein the first cluster head calculates a dependency score of a function executable on specific contents in the first cluster and the second cluster based on a number of interests generated for the function executable on the specific contents in the first cluster and the second cluster.

Example 35 is an ICN as in Examples 27-34, wherein the first cluster head coordinates caching of data and FEs in the first cluster and the second cluster based on most recent calculated values of content and FE popularity scores and FE-content dependency as indicated by an FE-content dependency score.

Example 36 is an ICN as in Examples 27-35, wherein the first cluster head, upon receipt of the interest packet, determines whether the first cluster head is authorized and eligible to act as an orchestrator to serve the interest packet or is to forward the interest packet to a next-hop node based on the aggregated data in the report.

Example 37 is an ICN as in Examples 27-36, wherein the first cluster head uses a learning based algorithm to select at least one node in at least one of the first cluster and the second cluster of nodes for assigning tasks for serving an interest packet and to determine an optimized route to the selected at least one node to optimize a cumulative key performance indicators score (C-KPI-Score), whereby the C-KPI-Score depends on at least one of content retrieval latency, function execution latency, and communication links qualities on the optimized route.

Example 38 is an ICN as in Examples 27-37, wherein the first cluster head generates and sends at least one unicast request packet to the selected at least one node via the optimized route, collects responses to the unicast request packet from the at least one node, prepares an aggregated response, and sends the aggregated response to a consumer node for the aggregated response.

Example 39 is an ICN as in Examples 27-38, wherein a node in the cluster of nodes starts a response timer upon receipt of the interest packet, and if the first cluster head responds to the interest packet before the response timer expires, the node in the cluster of nodes does not process the interest packet, while if the first cluster head does not respond to the interest packet before the response timer expires, the first cluster head either responds or forwards the interest packet to a next hop.

Example 40 is an ICN as in Examples 27-39, wherein the interest packet comprises fields that specify an absolute time after which data in the interest packet expires and new data to swap in place of the data in the interest packet after the data in the interest packet expires.

Example 41 is an ICN as in Examples 27-40, wherein the other nodes in the first cluster comprise content stores that store the interest packet fields specifying the absolute time after which data in the interest packet expires and new data to swap in place of the data in the interest packet after the data in the interest packet expires, and the other nodes in the first cluster swap the new data in place of the data in the interest packet when the data in the interest packet expires.

Example 42 is an ICN as in Examples 27-41, wherein the first cluster head delivers DRM content to a consumer node containing a DRM engine that is trusted by the first cluster head to apply DRM rules associated with the DRM content using a DRM function that is either embedded in the DRM engine or supplied with the content.

Example 43 is an ICN as in Examples 27-42, wherein the first cluster head encrypts the DRM content and the DRM rules with a bulk encryption key (BEK) where the BEK is wrapped using a consumer's public encryption key.

Example 44 is an ICN as in Examples 27-43, wherein the first cluster head obtains a consumer's public key or attestation information about the DRM engine by showing interest in the consumer's public key or the DRM engine, respectively, via the ICN.

Example 45 is an ICN as in Examples 27-44, further comprising a data packet originating node and an aggregation node, and further comprising means for limiting a number of scoped interest packets sent within a region of interest within the ICN by eliminating duplicated scoped interest packets sent to given node in the ICN either by the originating node or by the aggregation node.

Example 46 is an ICN as in Examples 27-45, wherein the means for limiting the number of scoped interest packets sent within the region of interest within the ICN includes a node in the first cluster that waits a certain amount of time determined by a randomized timer before forwarding a scoped interest packet.

Example 47 is an ICN as in Examples 27-46, wherein the means for limiting the number of scoped interest packets sent within the region of interest within the ICN elects a few nodes in the ICN or forms a cluster to parallelize collection of data when multiple authorized solicitors of non-mobile ICN nodes are available.

Example 48 is an ICN as in Examples 27-47, wherein the means for limiting the number of scoped interest packets sent within the region of interest within the ICN filters requested data to select streams based on contextual information.

Example 49 is an ICN as in Examples 27-48, wherein the means for limiting the number of scoped interest packets sent within the region of interest within the ICN uses a time-to-live field (TTL) with a pre-determined hop count for the region of interest within the interest packet to ensure that a same interest packet does not keep circulating amongst nodes within the region of interest.

Example 50 is an ICN as in Examples 27-49, wherein the means for limiting the number of scoped interest packets sent within the region of interest within the ICN limits multiple responses for a same scoped interest packet by, when a node receives a second interest packet requesting a same content as requested by a first interest packet, deleting the second interest packet.

Example 51 is an ICN as in Examples 27-50, wherein the means for limiting the number of scoped interest packets sent within the region of interest within the ICN determines, at an aggregation node, that the aggregation node has received duplicate content from two or more different nodes and discards duplicate content.

Example 52 is an ICN as in Examples 27-51, wherein the means for limiting the number of scoped interest packets sent within the region of interest within the ICN uses a Bloom filter in the interest packet to reduce the size of the interest packet.

Example 53 is a non-transitory computer-readable medium comprising instructions that when executed by a processor cause the processor to perform operations for coordinating the functions of a plurality of clustered nodes in an information-centric network (ICN), the operations comprising exchanging, by a cluster head, a report with at least one other node in a first cluster and a cluster head of a second cluster of nodes, the report including aggregated data for the first cluster of nodes, wherein the first cluster of nodes comprises the cluster head, the cluster head functioning as an orchestrator and coordinator for managing caching, routing, and computing of data in interest packets by at least one of other nodes in the first cluster and nodes in other clusters, and coordinating, by the cluster head, with the at least one of the other nodes in the first cluster and the cluster head of the second cluster of nodes to establish an interest packet routing strategy and cache management of content and FEs based on the aggregated data in the report.

Example 54 is a medium as in Example 53, wherein the aggregated data for the first cluster includes at least one of cached content, cached Function Executables (FEs), forwarding information base (FIB) entries to reach contents and FEs beyond the first cluster, popularity scores for contents and FEs, available remaining cache capacity, and computational capabilities, further comprising instructions that when executed by the processor cause the processor to perform operations including, upon receipt of an interest packet, serving content and compute requests to at least one of the other nodes in the first cluster and the cluster head of the second cluster of nodes based on the established interest packet routing strategy and cache management of content and FEs; updating the report; and repeating the exchanging, coordinating, and serving based on aggregated data in the updated report.

Example 55 is a medium as in Examples 53 and 54, further comprising instructions that when executed by the processor cause the processor to perform operations including selecting as the cluster head of the first cluster of nodes a node that supports ICN and internet protocol (IP) network layer protocols and that includes an adaptation layer between the ICN and IP network.

Example 56 is a medium as in Examples 53-55, further comprising instructions that when executed by the processor cause the processor to perform operations including receiving an interest packet or a request for content on one of the ICN and IP network, providing the interest packet or request for content through the adaptation layer, retrieving content from the other of the ICN and IP network, and providing the retrieved content to the one of the ICN and IP network.

Example 57 is a medium as in Examples 53-56, further comprising instructions that when executed by the processor cause the processor to perform operations including sending, by each node in the first cluster, an interest packet or a content request to an orchestrator node in the first cluster to determine which node in the first cluster supports co-existence of the ICN and IP network layer protocols, obtaining content either on the ICN or the IP network to optimize a cumulative key performance indicators score (C-KPI-Score), whereby the C-KPI-Score depends on at least one of content retrieval latency, function execution latency, and communication links qualities on the optimized route, and sending back a response to a requesting node on a same network layer protocol as that of the interest packet or content request sent by the node that sent the content request for which the response is being sent.

Example 58 is a medium as in Examples 53-57, further comprising instructions that when executed by the processor cause the processor to perform operations including calculating from aggregated data in the report the popularity scores for cached content and FEs in the first cluster, cached content and FEs in the second cluster, and content and FEs reachable in the ICN from the first cluster based on forwarding information base (FIB) data shared by the cluster head of the second cluster of nodes.

Example 59 is a medium as in Examples 53-58, wherein the instructions for calculating the popularity scores implement a learning algorithm that determines the popularity scores based on at least one input feature selected from a group of features comprising number of interests generated, time stamp and location of the interests, history of other interests requested from a producer of interests, popularity score of previous interests from the producer of interests, and popularity scores shared by the cluster head of the second cluster of nodes.

Example 60 is a medium as in Examples 53-59, further comprising instructions that when executed by the processor cause the processor to perform operations including calculating a dependency score of a function executable on specific contents in the first cluster and the second cluster based on a number of interests generated for the function executable on the specific contents in the first cluster and the second cluster.

Example 61 is a medium as in Examples 53-60, further comprising instructions that when executed by the processor cause the processor to perform operations including coordinating caching of data and FEs in the first cluster and the second cluster based on most recent calculated values of content and FE popularity scores and FE-content dependency as indicated by an FE-content dependency score.

Example 62 is a medium as in Examples 53-61, further comprising instructions that when executed by the processor cause the processor to perform operations including, upon receipt of the interest packet by the cluster head, determining whether the cluster head is authorized and eligible to act as an orchestrator to serve the interest packet or is to forward the interest packet to a next-hop node based on the aggregated data in the report.

Example 63 is a medium as in Examples 53-62, wherein coordinating by the cluster head comprises executing instructions to perform operations including selecting, using a learning based algorithm, at least one node in at least one of the first cluster and the second cluster of nodes for assigning tasks for serving an interest packet, and determining an optimized route to the selected at least one node to optimize a cumulative key performance indicators score (C-KPI-Score), whereby the C-KPI-Score depends on at least one of content retrieval latency, function execution latency, and communication links qualities on the optimized route.

Example 64 is a medium as in Examples 53-63, further comprising instructions that when executed by the processor cause the processor to perform operations including generating and sending at least one unicast request packet to the selected at least one node via the optimized route, collecting responses to the unicast request packet from the at least one node, preparing an aggregated response, and sending the aggregated response to a consumer node for the aggregated response.

Example 65 is a medium as in Examples 53-64, further comprising instructions that when executed by the processor cause the processor to perform operations including providing fields in the interest packet that specify an absolute time after which data in the interest packet expires and new data to swap in place of the data in the interest packet after the data in the interest packet expires.

Example 66 is a medium as in Examples 53-65, wherein the other nodes in the first cluster comprise content stores that store the interest packet fields specifying the absolute time after which data in the interest packet expires and new data to swap in place of the data in the interest packet after the data in the interest packet expires, further comprising instructions that when executed by the processor cause the processor to perform operations including swapping the new data in place of the data in the interest packet when the data in the interest packet expires.

Example 67 is a medium as in Examples 53-66, further comprising instructions that when executed by the processor cause the processor to perform operations including delivering DRM content to a consumer node containing a DRM engine that is trusted by the cluster head to apply DRM rules associated with the DRM content using a DRM function that is either embedded in the DRM engine or supplied with the content.

Example 68 is a medium as in Examples 53-67, further comprising instructions that when executed by the processor cause the processor to perform operations including encrypting the DRM content and the DRM rules with a bulk encryption key (BEK) where the BEK is wrapped using a consumer's public encryption key.

Example 69 is a medium as in Examples 53-68, further comprising instructions that when executed by the processor cause the processor to perform operations including obtaining a consumer's public key or attestation information about the DRM engine by showing interest in the consumer's public key or the DRM engine, respectively, via the ICN.

Example 70 is a medium as in Examples 53-69, wherein the ICN comprises a data packet originating node and an aggregation node, further comprising instructions that when executed by the processor cause the processor to perform operations including limiting a number of scoped interest packets sent within a region of interest within the ICN by eliminating duplicated scoped interest packets sent to given node in the ICN either by the originating node or by the aggregation node.

Example 71 is a medium as in Examples 53-70, wherein the instructions for limiting the number of scoped interest packets sent within the region of interest within the ICN comprises instructions for having a node in the first cluster wait a certain amount of time determined by a randomized timer before forwarding a scoped interest packet.

Example 72 is a medium as in Examples 53-71, wherein the instructions for limiting the number of scoped interest packets sent within the region of interest within the ICN comprises instructions for electing a few nodes in the ICN or forming a cluster to parallelize collection of data when multiple authorized solicitors of non-mobile ICN nodes are available.

Example 73 is a medium as in Examples 53-72, wherein the instructions for limiting the number of scoped interest packets sent within the region of interest within the ICN comprises instructions for filtering requested data to select streams based on contextual information.

Example 74 is a medium as in Examples 53-73, wherein the instructions for limiting the number of scoped interest packets sent within the region of interest within the ICN comprises instructions for using a time-to-live field (TTL) with a pre-determined hop count for the region of interest within the interest packet to ensure that a same interest packet does not keep circulating amongst nodes within the region of interest.

Example 75 is a medium as in Examples 53-74, wherein the instructions for limiting the number of scoped interest packets sent within the region of interest within the ICN comprises instructions for limiting multiple responses for a same scoped interest packet by, when a node receives a second interest packet requesting a same content as requested by a first interest packet, deleting the second interest packet.

Example 76 is a medium as in Examples 53-75, wherein the instructions for limiting the number of scoped interest packets sent within the region of interest within the ICN comprises instructions for determining that the aggregation node has received duplicate content from two or more different nodes and discarding duplicate content.

Example 77 is a medium as in Examples 53-76, wherein the instructions for limiting the number of scoped interest packets sent within the region of interest within the ICN comprises instructions for using a Bloom filter in the interest packet to reduce the size of the interest packet.

Example 78 is an information-centric network (ICN) that coordinates the functions of a plurality of clustered nodes, comprising a first cluster of nodes comprising a first cluster head and a second cluster of nodes comprising a second cluster head, wherein the first cluster head functions as an orchestrator and coordinator for managing caching, routing, and computing of data in interest packets by at least one of other nodes in the first cluster and nodes in the second cluster, the first cluster head including means for exchanging a report with at least one of the other nodes in the first cluster and the second cluster head, the report including aggregated data for the first cluster, and the first cluster head including means for coordinating with the at least one of the other nodes in the first cluster and the second cluster head to establish an interest packet routing strategy and cache management of content and FEs based on the aggregated data in the report.

Example 79 is an ICN as in Example 78, wherein the aggregated data in the report includes at least one of cached content, cached Function Executables (FEs), forwarding information base (FIB) entries to reach contents and FEs beyond the first cluster, popularity scores for contents and FEs, available remaining cache capacity, and computational capabilities, and wherein the first cluster head, upon receipt of an interest packet, serves content and compute requests to at least one of the other nodes in the first cluster and the second cluster head based on the established interest packet routing strategy and cache management of content and FEs, updates the report, and repeats the exchanging, coordinating, and serving based on aggregated data in the updated report.

Example 80 is an ICN as in Examples 78 and 79, wherein the first cluster head is a node that supports ICN and internet protocol (IP) network layer protocols and includes an adaptation layer between the ICN and IP network.

Example 81 is an ICN as in Examples 78-80, wherein the first cluster head receives an interest packet or a request for content on one of the ICN and IP network, provides the interest packet or request for content through the adaptation layer, retrieves content from the other of the ICN and IP network, and provides the retrieved content to the one of the ICN and IP network.

Example 82 is an ICN as in Examples 78-81, wherein each node in the first cluster sends an interest packet or a content request to an orchestrator node in the first cluster to determine which node in the first cluster supports co-existence of the ICN and IP network layer protocols, and the first cluster head obtains content either on the ICN or the IP network to optimize a cumulative key performance indicators score (C-KPI-Score), whereby the C-KPI-Score depends on at least one of content retrieval latency, function execution latency, and communication links qualities on the optimized route, and a node in the first cluster sends back a response to a requesting node on a same network layer protocol as that of the interest packet or content request sent by the node that sent the content request for which the response is being sent.

Example 83 is an ICN as in Examples 78-82, wherein the first cluster head calculates from aggregated data in the report the popularity scores for cached content and FEs in the first cluster, cached content and FEs in the second cluster, and content and FEs reachable in the ICN from the first cluster based on forwarding information base (FIB) data shared by the second cluster head.

Example 84 is an ICN as in Examples 78-83, wherein the first cluster head calculates the popularity scores using a learning algorithm that determines the popularity scores based on at least one input feature selected from a group of features comprising number of interests generated, time stamp and location of the interests, history of other interests requested from a producer of interests, popularity score of previous interests from the producer of interests, and popularity scores shared by the second cluster head.

Example 85 is an ICN as in Examples 78-84, wherein the first cluster head calculates a dependency score of a function executable on specific contents in the first cluster and the second cluster based on a number of interests generated for the function executable on the specific contents in the first cluster and the second cluster.

Example 86 is an ICN as in Examples 78-85, wherein the first cluster head coordinates caching of data and FEs in the first cluster and the second cluster based on most recent calculated values of content and FE popularity scores and FE-content dependency as indicated by an FE-content dependency score.

Example 87 is an ICN as in Examples 78-86, wherein the first cluster head, upon receipt of the interest packet, determines whether the first cluster head is authorized and eligible to act as an orchestrator to serve the interest packet or is to forward the interest packet to a next-hop node based on the aggregated data in the report.

Example 88 is an ICN as in Examples 78-87, wherein the first cluster head uses a learning based algorithm to select at least one node in at least one of the first cluster and the second cluster of nodes for assigning tasks for serving an interest packet and to determine an optimized route to the selected at least one node to optimize a cumulative key performance indicators score (C-KPI-Score), whereby the C-KPI-Score depends on at least one of content retrieval latency, function execution latency, and communication links qualities on the optimized route.

Example 89 is an ICN as in Examples 78-88, wherein the first cluster head generates and sends at least one unicast request packet to the selected at least one node via the optimized route, collects responses to the unicast request packet from the at least one node, prepares an aggregated response, and sends the aggregated response to a consumer node for the aggregated response.

Example 90 is an ICN as in Examples 78-89, wherein a node in the cluster of nodes starts a response timer upon receipt of the interest packet, and if the first cluster head responds to the interest packet before the response timer expires, the node in the cluster of nodes does not process the interest packet, while if the first cluster head does not respond to the interest packet before the response timer expires, the first cluster head either responds or forwards the interest packet to a next hop.

Example 91 is an ICN as in Examples 78-90, wherein the interest packet comprises fields that specify an absolute time after which data in the interest packet expires and new data to swap in place of the data in the interest packet after the data in the interest packet expires.

Example 92 is an ICN as in Examples 78-91, wherein the other nodes in the first cluster comprise content stores that store the interest packet fields specifying the absolute time after which data in the interest packet expires and new data to swap in place of the data in the interest packet after the data in the interest packet expires, and the other nodes in the first cluster swap the new data in place of the data in the interest packet when the data in the interest packet expires.

Example 93 is an ICN as in Examples 78-92, wherein the first cluster head delivers DRM content to a consumer node containing a DRM engine that is trusted by the first cluster head to apply DRM rules associated with the DRM content using a DRM function that is either embedded in the DRM engine or supplied with the content.

Example 94 is an ICN as in Examples 78-93, wherein the first cluster head encrypts the DRM content and the DRM rules with a bulk encryption key (BEK) where the BEK is wrapped using a consumer's public encryption key.

Example 95 is an ICN as in Examples 78-94, wherein the first cluster head obtains a consumer's public key or attestation information about the DRM engine by showing interest in the consumer's public key or the DRM engine, respectively, via the ICN.

Example 96 is an ICN as in Examples 78-95, further comprising a data packet originating node and an aggregation node, and further comprising means for limiting a number of scoped interest packets sent within a region of interest within the ICN by eliminating duplicated scoped interest packets sent to given node in the ICN either by the originating node or by the aggregation node.

Example 97 is an ICN as in Examples 78-96, wherein the means for limiting the number of scoped interest packets sent within the region of interest within the ICN includes a node in the first cluster that waits a certain amount of time determined by a randomized timer before forwarding a scoped interest packet.

Example 98 is an ICN as in Examples 78-97, wherein the means for limiting the number of scoped interest packets sent within the region of interest within the ICN elects a few nodes in the ICN or forms a cluster to parallelize collection of data when multiple authorized solicitors of non-mobile ICN nodes are available.

Example 99 is an ICN as in Examples 78-98, wherein the means for limiting the number of scoped interest packets sent within the region of interest within the ICN filters requested data to select streams based on contextual information.

Example 100 is an ICN as in Examples 78-99, wherein the means for limiting the number of scoped interest packets sent within the region of interest within the ICN uses a time-to-live field (TTL) with a pre-determined hop count for the region of interest within the interest packet to ensure that a same interest packet does not keep circulating amongst nodes within the region of interest.

Example 101 is an ICN as in Examples 78-100, wherein the means for limiting the number of scoped interest packets sent within the region of interest within the ICN limits multiple responses for a same scoped interest packet by, when a node receives a second interest packet requesting a same content as requested by a first interest packet, deleting the second interest packet.

Example 102 is an ICN as in Examples 78-101, wherein the means for limiting the number of scoped interest packets sent within the region of interest within the ICN determines, at an aggregation node, that the aggregation node has received duplicate content from two or more different nodes and discards duplicate content.

Example 103 is an ICN as in Examples 78-102, wherein the means for limiting the number of scoped interest packets sent within the region of interest within the ICN uses a Bloom filter in the interest packet to reduce the size of the interest packet.

It will be further appreciated that each of the embodiments described herein may be used independent of the other embodiments or selectively used with any of the other embodiments as desired. For example, it is not necessary for the nodes to be clustered and to have a cluster node. The systems and methods described herein may or may not be used with clustered ICN based networks.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A computer-implemented method for coordinating the functions of a plurality of clustered nodes in an information-centric network (ICN), comprising:
    selecting, as a cluster head of a first cluster of nodes, a node that supports ICN and internet protocol (IP) network layer protocols and includes an adaptation layer between the ICN and IP network configured to convert requests between the IP network layer protocol and the ICN layer protocol;
    exchanging, by the cluster head, a report with at least one other node in the first cluster and a cluster head of a second cluster of nodes, the report including aggregated data for the first cluster of nodes,
    wherein the cluster head functions as an orchestrator and coordinator for managing caching, routing, and computing of data in interest packets by at least one of the other nodes in the first cluster and nodes in the second cluster of nodes; and
    coordinating, by the cluster head, with the at least one of the other nodes in the first cluster and the cluster head of the second cluster of nodes to establish an interest packet routing strategy and cache management of content and Function Executables (FEs) based on the aggregated data in the report.

2. The method of claim 1, wherein the aggregated data for the first cluster includes at least one of cached content, cached FEs, forwarding information base (FIB) entries to reach contents and FEs beyond the first cluster, popularity scores for contents and FEs, available remaining cache capacity, and computational capabilities, further comprising:
    upon receipt of an interest packet, serving, by the cluster head, content and compute requests to at least one of the other nodes in the first cluster and the cluster head of the second cluster of nodes based on the established interest packet routing strategy and cache management of content and FEs;
    updating the report; and
    repeating the exchanging, coordinating, and serving based on aggregated data in the updated report.

3. The method of claim 1, further comprising receiving an interest packet or a request for content on one of the ICN and IP network, providing the interest packet or request for content through the adaptation layer, retrieving content from the other of the ICN and IP network, and providing the retrieved content to the one of the ICN and IP network.

4. The method of claim 1, further comprising sending, by each node in the first cluster, an interest packet or a content request to an orchestrator node in the first cluster to determine which node in the first cluster supports co-existence of the ICN and IP network layer protocols, obtaining, by the cluster head, content either on the ICN or the IP network to optimize a cumulative key performance indicators score (C-KPI-Score), whereby the C-KPI-Score depends on at least one of content retrieval latency, function execution latency, and communication links qualities on the optimized route, and sending back a response to a requesting node on a same network layer protocol as that of the interest packet or content request sent by the node that sent the content request for which the response is being sent.

5. The method of claim 1, further comprising calculating, by the cluster head from aggregated data in the report, popularity scores for cached content and FEs in the first cluster, cached content and FEs in the second cluster, and content and FEs reachable in the ICN from the first cluster based on forwarding information base (FIB) data shared by the cluster head of the second cluster of nodes.

6. The method of claim 5, wherein calculating the popularity scores comprises a learning algorithm determining the popularity scores based on at least one input feature selected from a group of features comprising number of interests generated, time stamp and location of the interests, history of other interests requested from a producer of interests, popularity score of previous interests from the producer of interests, and popularity scores shared by the cluster head of the second cluster of nodes.

7. The method of claim 5, further comprising calculating, by the cluster head, a dependency score of a function executable on specific contents in the first cluster and the second cluster based on a number of interests generated for the function executable on the specific contents in the first cluster and the second cluster.

8. The method of claim 7, further comprising coordinating caching, by the cluster head, data and FEs in the first cluster and the second cluster based on most recent calculated values of content and FE popularity scores and FE-content dependency as indicated by an FE-content dependency score.

9. The method of claim 1, further comprising, upon receipt of the interest packet by the cluster head, determining, by the cluster head, whether the cluster head is authorized and eligible to act as an orchestrator to serve the interest packet or is to forward the interest packet to a next-hop node based on the aggregated data in the report.

10. The method of claim 1, wherein coordinating by the cluster head comprises selecting, using a learning based algorithm, at least one node in at least one of the first cluster and the second cluster of nodes for assigning tasks for serving an interest packet and determining an optimized route to the selected at least one node to optimize a cumulative key performance indicators score (C-KPI-Score), whereby the C-KPI-Score depends on at least one of content retrieval latency, function execution latency, and communication links qualities on the optimized route.

11. The method of claim 10, further comprising generating and sending, by the cluster head, at least one unicast request packet to the selected at least one node via the optimized route, collecting responses to the unicast request packet from the at least one node, preparing an aggregated response, and sending the aggregated response to a consumer node for the aggregated response.

12. The method of claim 1, wherein a node in the cluster of nodes starts a response timer upon receipt of the interest packet, and if the cluster head responds to the interest packet before the response timer expires, the node in the cluster of nodes does not process the interest packet, while if the cluster head does not respond to the interest packet before the response timer expires, the cluster head either responds or forwards the interest packet to a next hop.

13. The method of claim 1, further comprising providing fields in the interest packet that specify an absolute time after which data in the interest packet expires and new data to swap in place of the data in the interest packet after the data in the interest packet expires.

14. The method of claim 13, wherein the other nodes in the first cluster comprise content stores that store the interest packet fields specifying the absolute time after which data in the interest packet expires and new data to swap in place of the data in the interest packet after the data in the interest packet expires, further comprising swapping the new data in place of the data in the interest packet when the data in the interest packet expires.

15. The method of claim 1, further comprising delivering, by the cluster head, digital rights management (DRM) content to a consumer node containing a DRM engine that is trusted by the cluster head to apply DRM rules associated with the DRM content using a DRM function that is either embedded in the DRM engine or supplied with the content.

16. The method of claim 15, further comprising encrypting the DRM content and the DRM rules with a bulk encryption key (BEK) where the BEK is wrapped using a consumer's public encryption key.

17. The method of claim 16, further comprising obtaining a consumer's public key or attestation information about the DRM engine by showing interest in the consumer's public key or the DRM engine, respectively, via the ICN.

18. The method of claim 1, wherein the ICN comprises a data packet originating node and an aggregation node, further comprising limiting a number of scoped interest packets sent within a region of interest within the ICN by eliminating duplicated scoped interest packets sent to given node in the ICN either by the originating node or by the aggregation node.

19. The method of claim 18, wherein limiting the number of scoped interest packets sent within the region of interest within the ICN comprises at least one of: (1) having a node in the first cluster wait a certain amount of time determined by a randomized timer before forwarding a scoped interest packet, (2) electing a few nodes in the ICN, (3) forming a cluster to parallelize collection of data when multiple authorized solicitors of non-mobile ICN nodes are available, (4) filtering requested data to select streams based on contextual information, (5) using a Bloom filter in the interest packet to reduce the size of the interest packet, and (6) determining, by an aggregation node, that the aggregation node has received duplicate content from two or more different nodes and discarding duplicate content.

20. The method of claim 18, wherein limiting the number of scoped interest packets sent within the region of interest within the ICN comprises using a time-to-live field (TTL) with a pre-determined hop count for the region of interest within the interest packet to ensure that a same interest packet does not keep circulating amongst nodes within the region of interest.

21. The method of claim 18, wherein limiting the number of scoped interest packets sent within the region of interest within the ICN comprises limiting multiple responses for a same scoped interest packet by, when a node receives a second interest packet requesting a same content as requested by a first interest packet, deleting the second interest packet.

22. A system including an information-centric network (ICN) that coordinates the functions of a plurality of clustered nodes, the system comprising:
 a first cluster of nodes comprising a first cluster head, the first cluster head configured to support ICN and internet protocol (IP) network layer protocols and comprising an adaptation layer between the ICN and IP network configured to convert requests between the IP network layer protocol and the ICN layer protocol; and
 a second cluster of nodes comprising a second cluster head,
 wherein the first cluster head functions as an orchestrator and coordinator for managing caching, routing, and computing of data in interest packets by at least one of other nodes in the first cluster and nodes in the second cluster,
 the first cluster head executing instructions for exchanging a report with at least one of the other nodes in the first cluster and the second cluster head, the report including aggregated data for the first cluster, and the first cluster head executing instructions for coordinating with the at least one of the other nodes in the first cluster and the second cluster head to establish an interest packet routing strategy and cache management of content and Function Executables (FEs) based on the aggregated data in the report.

23. A non-transitory computer-readable medium comprising instructions that when executed by a processor cause the processor to perform operations for coordinating the functions of a plurality of clustered nodes in an information-centric network (ICN), the operations comprising:

selecting, as a cluster head of a first cluster of nodes, a node that supports ICN and internet protocol (IP) network layer protocols and includes an adaptation layer between the ICN and IP network configured to convert requests between the IP network layer protocol and the ICN layer protocol;

exchanging, by the cluster head, a report with at least one other node in the first cluster of nodes and a cluster head of a second cluster of nodes, the report including aggregated data for the first cluster of nodes, wherein the first cluster of nodes comprises the cluster head, the cluster head functioning as an orchestrator and coordinator for managing caching, routing, and computing of data in interest packets by at least one of other nodes in the first cluster and nodes in other clusters; and coordinating, by the cluster head, with the at least one of the other nodes in the first cluster and the cluster head of the second cluster of nodes to establish an interest packet routing strategy and cache management of content and Function Executables (FEs) based on the aggregated data in the report.

24. A system that includes an information-centric network (ICN) that coordinates the functions of a plurality of clustered nodes, the system comprising:

a first cluster of nodes comprising a first cluster head, the first cluster head configured to support ICN and internet protocol (IP) network layer protocols and comprising an adaptation layer between the ICN and IP network configured to convert requests between the IP network layer protocol and the ICN layer protocol; and a second cluster of nodes comprising a second cluster head, wherein the first cluster head functions as an orchestrator and coordinator for managing caching, routing, and computing of data in interest packets by at least one of other nodes in the first cluster and nodes in the second cluster, the first cluster head including means for exchanging a report with at least one of the other nodes in the first cluster and the second cluster head, the report including aggregated data for the first cluster, and the first cluster including means for coordinating with the at least one of the other nodes in the first cluster and the second cluster head to establish an interest packet routing strategy and cache management of content and Function Executables (FEs) based on the aggregated data in the report.

* * * * *